United States Patent [19]

Hayakawa

[11] Patent Number: 5,189,460
[45] Date of Patent: Feb. 23, 1993

[54] CAMERA DETECTING LUMINANCE FROM A PLURALITY OF AREAS

[75] Inventor: Shingo Hayakawa, Kanagawa, Japan
[73] Assignee: Canon Kabushiki Kaisha, Tokyo, Japan
[21] Appl. No.: 646,250
[22] Filed: Jan. 28, 1991
[30] Foreign Application Priority Data Jan. 30, 1990 [JP] Japan .................. 2-19742
Jan. 30, 1990 [JP] Japan .................. 2-19752

[51] Int. Cl.$^5$ ............................ G03B 13/36
[52] U.S. Cl. .................. 354/402; 354/432; 354/406
[58] Field of Search ........... 354/400, 402, 407, 408, 354/406, 432

[56] References Cited

U.S. PATENT DOCUMENTS

| | | | |
|---|---|---|---|
| Re. 31,370 | 9/1983 | Mashimo et al. | 354/402 |
| 4,047,187 | 7/1977 | Mashimo et al. | 354/402 |
| 4,483,602 | 11/1984 | Aoki et al. | |
| 4,534,636 | 8/1985 | Sugawara | |
| 4,704,024 | 11/1987 | Tsunekawa | |
| 4,745,427 | 5/1988 | Izumi et al. | |
| 4,746,947 | 5/1988 | Nakai | 354/402 |
| 4,774,401 | 9/1988 | Yamada et al. | 354/432 |
| 4,786,935 | 11/1988 | Hayakawa et al. | 354/432 |
| 4,912,495 | 3/1990 | Ishikawa et al. | 354/402 |
| 5,040,014 | 8/1991 | Hata et al. | 354/402 |

FOREIGN PATENT DOCUMENTS

| | | |
|---|---|---|
| 3211234 | 10/1982 | Fed. Rep. of Germany . |
| 2539519 | 7/1984 | France . |
| 51-9271 | 1/1976 | Japan . |
| 62-203022 | 9/1987 | Japan . |
| 63-7330 | 2/1988 | Japan . |
| 1-202720 | 8/1989 | Japan . |
| 2077448 | 12/1981 | United Kingdom . |

Primary Examiner—Russell E. Adams
Attorney, Agent, or Firm—Fitzpatrick, Cella, Harper & Scinto

[57] ABSTRACT

A camera which can find light measurement value in consideration of both a main object and a field of view includes a detecting circuit for dividing the field of view into a plurality of small areas and detecting the luminance of each of the small areas, a focus detecting circuits capable of detecting focuses of a plurality of focus detecting areas in the field of view, a setting circuit for classifying the plurality of small areas into preset which vary in accordance with a selection of one of the focus detecting areas, and a calculation circuit for calculating a light measurement value by using the luminance of two or more of the small areas and changing degrees of weight on the small areas classified by the setting means.

30 Claims, 13 Drawing Sheets

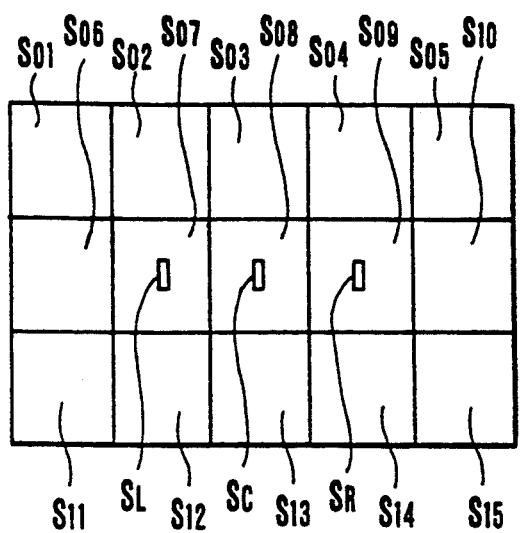
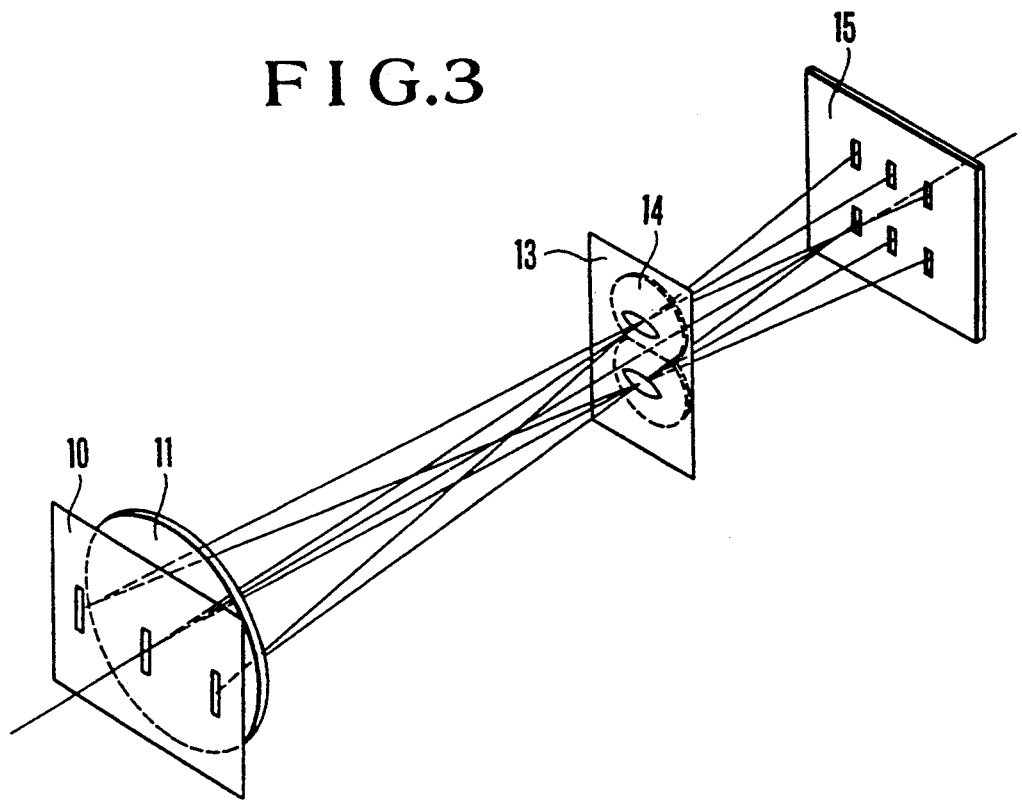

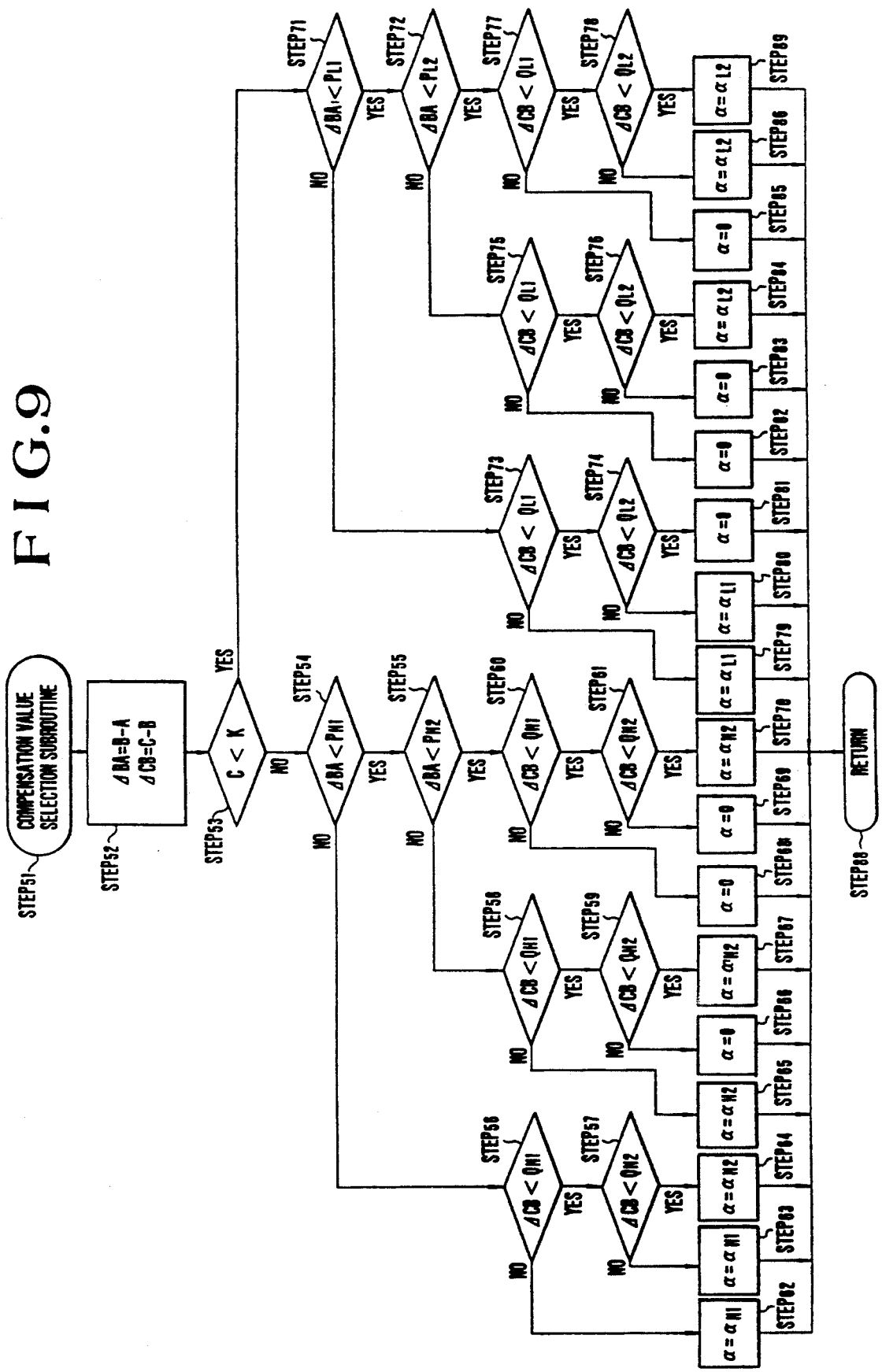

FIG.10(a)

$K \leq C$

|  | $\Delta CB$ |  |
|---|---|---|
| (STEP68) (vii) $\alpha=0$ | (STEP65) (iv) $Q_{H1}$ $\alpha=\alpha_{H2}$ | (STEP62) (i) $\alpha=\alpha_{H1}$ |
| (STEP69) $P_{H2}$ (viii) $\alpha=0$ | (STEP66) 0 (v) $\alpha=0$ | (STEP63) $P_{H1}$ (ii) $\alpha=\alpha_{H1}$ → $\Delta BA$ |
| $\alpha=\alpha_{H2}$ (ix) (STEP70) | $Q_{H2}$ $\alpha=\alpha_{H2}$ (vi) (STEP67) | $\alpha=\alpha_{H2}$ (iii) (STEP64) |

|  | $\Delta CB$ |  |
|---|---|---|
| (STEP85) (vii) $\alpha=0$ | (STEP82) (iv) $Q_{L1}$ $\alpha=0$ | (STEP79) (i) $\alpha=\alpha_{L1}$ |
| (STEP86) $P_{L2}$ (viii) $\alpha=\alpha_{L2}$ | (STEP83) 0 (v) $\alpha=0$ | (STEP80) $P_{L1}$ (ii) $\alpha=\alpha_{L1}$ → $\Delta BA$ |
| $\alpha=\alpha_{L2}$ (ix) (STEP87) | $Q_{L2}$ $\alpha=\alpha_{L2}$ (vi) (STEP84) | $\alpha=0$ (iii) (STEP81) |

FIG.11(a)
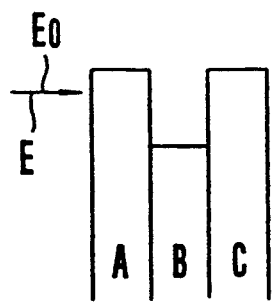
(vii) (STEP 68)
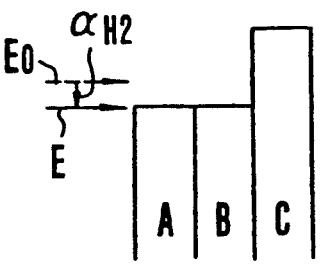
(iv) (STEP 65)
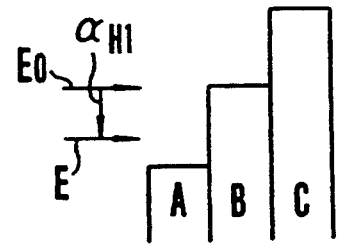
(i) (STEP 62)
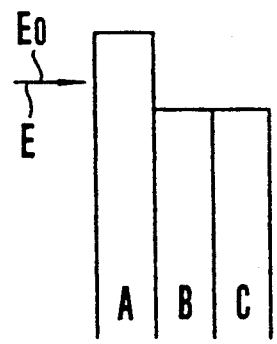
(viii) (STEP 69)
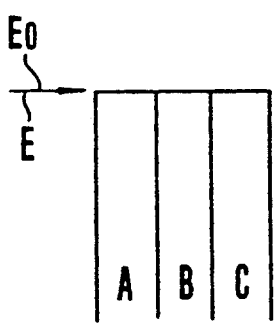
(v) (STEP 66)
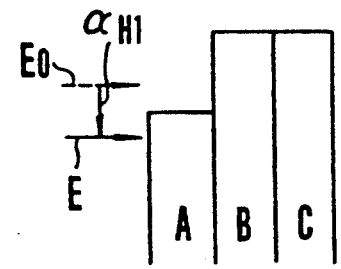
(ii) (STEP 63)
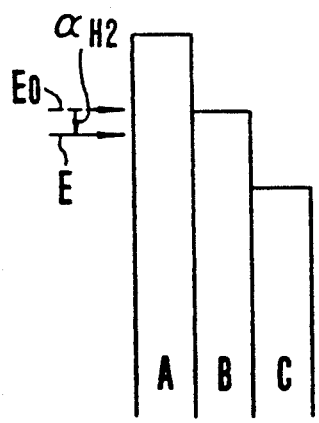
(ix) (STEP 70)
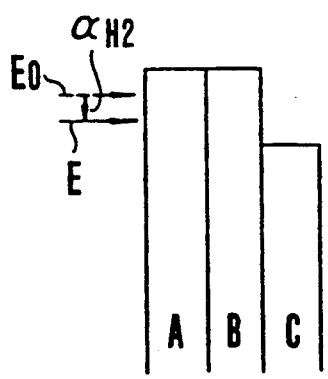
(vi) (STEP 67)
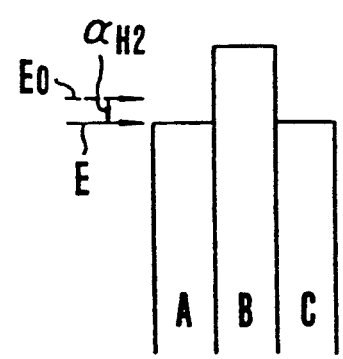
(iii) (STEP 64)

FIG.11(b)
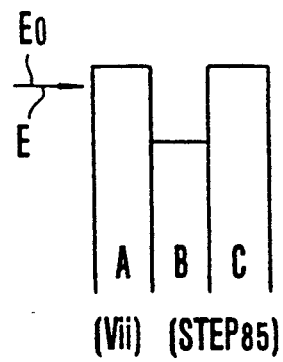
(Vii) (STEP85)
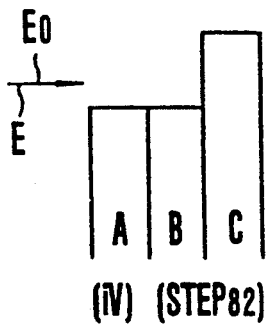
(iv) (STEP82)
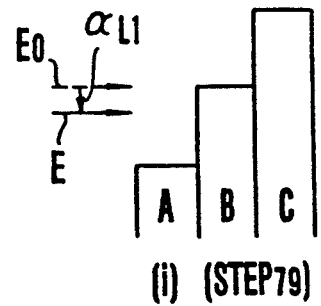
(i) (STEP79)
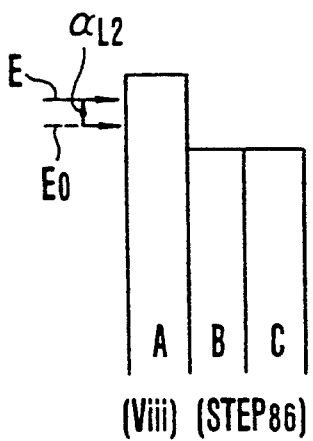
(Viii) (STEP86)
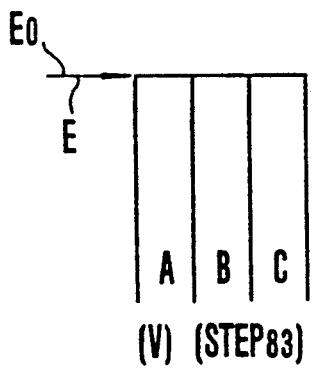
(V) (STEP83)
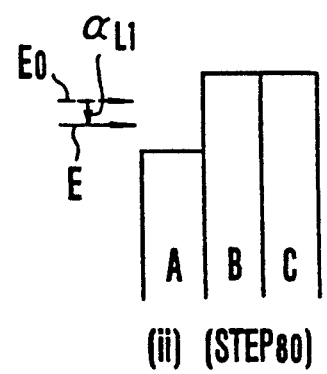
(ii) (STEP80)
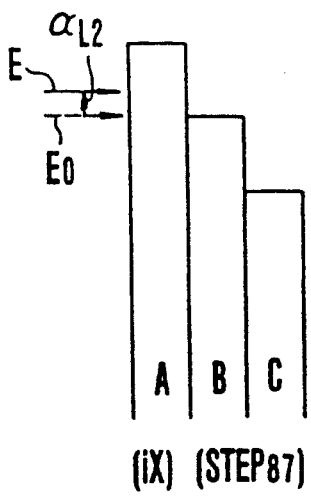
(ix) (STEP87)
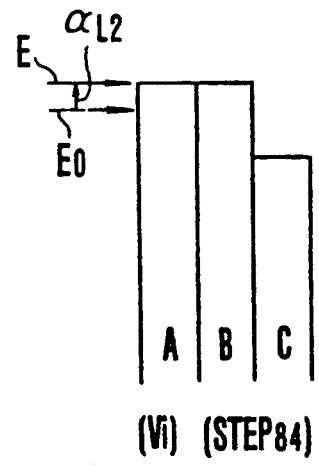
(Vi) (STEP84)
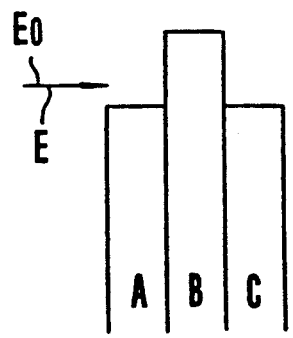
(iii) (STEP81)

FIG.12(a)

| 0.1  | 0.25 | 0.1  | 0.1 | 0.1 |
|------|------|------|-----|-----|
| 0.25 | 1    | 0.25 | 0.1 | 0.1 |
| 0.1  | 0.25 | 0.1  | 0.1 | 0.1 |

FIG.12(b)

| 0.1 | 0.1  | 0.25 | 0.1  | 0.1 |
|-----|------|------|------|-----|
| 0.1 | 0.25 | 1    | 0.25 | 0.1 |
| 0.1 | 0.1  | 0.25 | 0.1  | 0.1 |

FIG.12(c)

| 0.1 | 0.1 | 0.1  | 0.25 | 0.1  |
|-----|-----|------|------|------|
| 0.1 | 0.1 | 0.25 | 1    | 0.25 |
| 0.1 | 0.1 | 0.1  | 0.25 | 0.1  |

SL  Sc  SR

SL  Sc  SR

CAMERA DETECTING LUMINANCE FROM A PLURALITY OF AREAS

BACKGROUND OF THE INVENTION

1. Field of the Invention

This invention relates to a camera which divides a field of view into a plurality of areas so as to perform a light measuring operation.

2. Description of the Related Art

There have been suggested various kinds of light measuring devices which divide a field of view into a plurality of areas, output luminance value signals of the respective areas, and give a correct exposure to a photographed image plane by using the plurality of luminance value signals.

For example, Japanese Utility Model Publication No. Sho 51-9271 suggests a light measuring device which obtains an arithmetical average value of the maximum value and the minimum value of outputs from a plurality of photoelectric conversion elements.

Furthermore, Japanese Patent Publication No. Sho 63-7330 suggests a light measuring device which divides a field of view into a plurality of areas, performs light measuring operation for a center area and a plurality of external areas arranged so as to surround the center area, regularizes the luminances of the plurality of areas by a standard value set between the maximum value and the minimum value of the luminances of the areas, classifies the field of view based on the regularized outputs, and calculates a light measuring value according to the classified outputs.

Although the above prior art gives little consideration to the arrangement of a main object in a photographed image plane, a light measuring device, in which the arrangement of the main object in the, photographed image plane is much considered, has also been suggested on the assumption that it is mounted in a camera including an automatic focus detecting device and so on.

For example, U.S. Pat. No. 4,912,495 suggests a light measuring device which regards a center portion of an image plane as a position where a main object is often placed, divides a field of view into a plurality of areas including at least a plurality of areas concentrically disposed around the center portion of the image plane, can precisely find a luminance of the main subject by selectively summing luminance value signals of the concentric areas by assuming the size of the main object based on information on magnification. This U.S. Patent also suggests changing the formula for operating a light measurement value which calculates the luminance of a background besides that of the main object and utilizes the difference between these luminances, so that a correct exposure is given to the main object and furthermore, an exposure suitable for the photographic conditions can be given if the main object is small.

U.S. Pat. No. 4,786,935 also suggests a light measuring device which regards a center portion of an image plane as a position where a main subject is often placed, divides a field of view into three areas, that is, a center area of the image plane, an outer area thereof and a further outer area thereof, simultaneously determines an approximate size of the main object and photographic conditions based on luminance value signals of these plurality of areas and the difference between luminance value signals of the adjoining areas, and provides a correct exposure. In this U.S. Patent, since an approximate size of the main object is determined by using the difference of the luminance value signals, it is more difficult to depend upon an actual size of the main object and a correct exposure can be obtained more stably compared with a device which assumes the size of the main object based on magnification.

In the two devices of the prior art quoted herein, the center portion of the image plane is regarded as a position where the main object is often placed because a focus detecting area of a camera having an automatic focus detecting device is generally set in the center of the image plane. On the other hand, an automatic focus detecting device having a plurality of focus detecting areas has been recently suggested. In a camera having such an automatic focus detecting device, the main object is easy to be placed in each of the plurality of focus detecting areas (therefore, also in specific areas besides the center portion of the image plane).

A light measuring device suitable for use in such a camera having a plurality of focus detecting areas is suggested in Japanese Laid-open Patent Application No. Hei 1-202720. This light measuring device utilizes a suggestion by Japanese Laid-open Patent Application No. Sho 62-203022 that the luminance of a main object may be determined based on information on the above-mentioned magnification, and performs an operation to change the weight of a certain light measuring area and other light measuring areas based on information on a selected focus detecting area and information on a focusing state of other focus detecting areas when the selected area is in an in-focus state, besides information on the magnification and information on the focal length of a picture-taking lens, finds a precise luminance of the main object and outputs the luminance as a light measurement value for natural light photographing.

Among the above conventional light measuring devices, only the Japanese Laid-open Patent Application No. Hei 1-202720 discloses a light measuring device suitable for use in a camera having a distance measuring device capable of separately measuring distances of a plurality of points in a field of view. Although this light measuring device additionally has a concept that the focusing states of a plurality of light measuring points are considered, the basic technical concept thereof is the same as that of the Japanese Laid-open Patent Application No. Sho 62-203022 which changes the area in the field of view to be considered in a light measurement value calculating operation in accordance with magnification so as to find a precise luminance of the main object.

Therefore, the disadvantage that the luminance of the main object is incorrectly measured and it is difficult to obtain a correct exposure if an actual size of the main object is different from the size which is initially assumed, is also succeeded. Furthermore, in such a technical concept that the area of the field of view to be considered is changed in a light measurement value calculating operation in accordance with the magnification, if the magnification becomes low, a discontinuous point in determination of photographic conditions, that is, whether a main object is regarded as a narrow area or almost the whole field of view, arises. Furthermore, if the difference between the luminance of the area to be measured and that of the other areas is large, the light measurement value is greatly changed by the result of the determination. In such a light measuring device, it is essential to use information on the focal length of the picture-taking lens and information on the object distance for the light measurement value calculating operation besides the luminance signals as outputs from the light measuring device, and, particularly in a single-lens reflex camera, devices for transmitting various kinds of information, processing signals and so on are complicated.

The above prior art, Japanese Laid-open Patent Application No. Hei 1-202720 discloses the concept that the existing range of the main object is assumed in consideration of the focusing state of a plurality of points to be measured and the weight of the luminance signal of the area of the field of view corresponding to each of the points to be measured. Such a concept is effective when the magnification is high, the main object occupies most parts of the photographed image plane and when the distances between a plurality of distance measuring points in the photographed image plane are short. However, in a general case, such as when a plurality of distance measuring points are arranged at some intervals in the photographed image plane and the main object does not occupy so large a part of the photographed image plane, since a background intervenes between a plurality of distance measuring points in an almost in-focus state, in particular, if the luminance difference between the main object and the background is large, the effect is lowered.

SUMMARY OF THE INVENTION

According to one aspect of this invention, there is provided a camera comprising focus detecting means capable of detecting focuses of a plurality of focus detecting areas of a field of view separately, light measuring means for dividing the field of view into a plurality of small areas and detecting the luminance of each of the small areas, setting means for classifying the small areas into preset combinations in accordance with a selection of one of the focus detecting areas, and calculation means for calculating a light measurement value by using the luminance of each of the small areas and changing degrees of weight on the small areas classified by the setting means, thereby being capable of finding the light measuring value while always taking a main object and the whole field of view into account.

BRIEF DESCRIPTION OF THE DRAWINGS

FIG. 1 is a view showing the shape of a divided light receiving portion for light measurement according to a first embodiment of this invention.

FIG. 3 is a perspective view of a multi-point focus detecting optical system according to the first embodiment of this invention.

FIGS. 5 to 9 are flowcharts of the first embodiment of this invention. FIGS. 10($a$), 10($b$), 11($a$), 11($b$), 12($a$), 12($b$) and 12($c$) are views explaining the flowcharts of the first embodiment of this invention.

DETAILED DESCRIPTION OF THE PREFERRED EMBODIMENTS

FIGS. 1 to 12($a$), 12($b$) and 12($c$) are views of a light measuring device of a camera provided with three focus detecting areas according to a first embodiment of this invention.

FIG. 1 shows the shape of a divided light receiving plane of a light receiving portion for light measurement according to the first embodiment of this invention, and the state in which the light receiving portion is projected onto a field of view. In the figure, $S_{01}$, $S_{02}$ ... $S_{15}$ designate a plurality of small areas for receiving light thereon which are divided into fifteen area, and $S_L$, $S_C$ and $S_R$ designate focus detecting fields which are projected onto the field of view in the same manner as the light-measurement light receiving portion. In this embodiment, the field of view is, as shown in FIG. 1, divided into fifteen small areas, that is, three small areas including three focus detecting areas (a focus detecting method has several types: a method of detecting the amount of defocus in a previous focusing state, a method of detecting the distance of an object as an absolute amount every time, and so on) and twelve small areas surrounding the three small areas, and the luminance of the field of view for each small area is measured.

Figure 2:
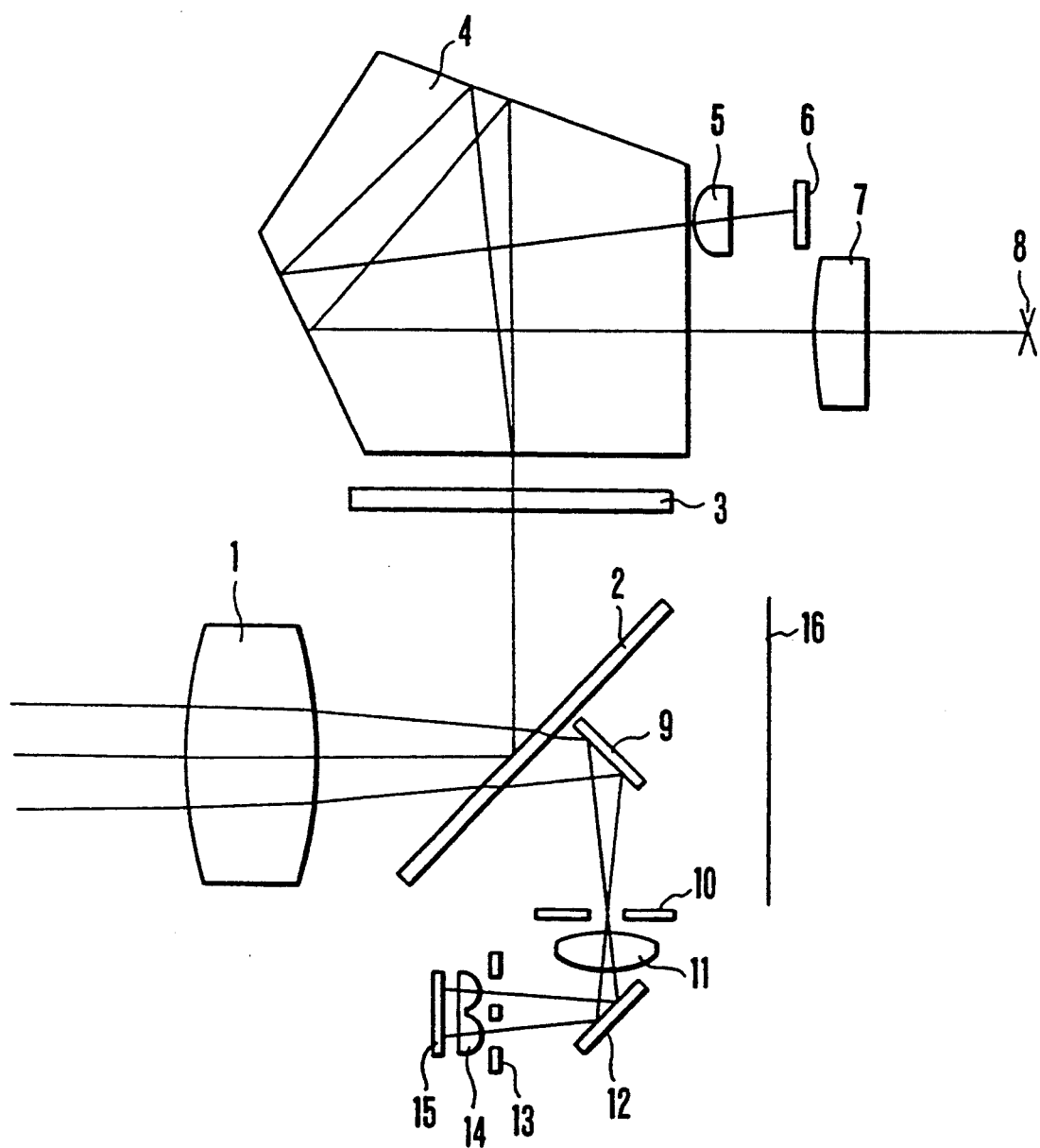
FIG. 2 is a sectional view of an optical system of a camera according to the first embodiment of this invention.

FIG. 2 is a view showing an arrangement of an optical system according to the first embodiment of this invention, which is constituted by a photo-taking lens 1, a quick-return mirror 2, a focusing screen 3, a pentagonal roof prism 4, an image forming lens 5 for light measurement, a light receiving portion 6 for light measurement, an eyepiece lens 7, a pupil position 8, a sub-mirror 9, a field mask 10, a condenser lens 11, a total-reflection mirror 12, a pupil division mask 13, a focus-detection image forming lens 14, a focus-detection light receiving portion 15 and a film plane 16. In this embodiment, a light measurement operation is performed by forming an object image, formed by the photo-taking lens 1 on the focusing screen 3, onto the light measurement-light receiving portion 6 by the light-measurement image forming lens 5 and dividing the object image into the fifteen small areas shown in FIG. 1. Furthermore, the focus of an area corresponding to the three focus detecting fields shown in FIG. 1 is detected by forming a part of the object image, formed adjacent to the field mask 10 disposed near an expected image plane of the phototaking lens 1, onto the focus-detection light receiving portion 15 by the focus-detection image forming lens 14.

FIG. 3 is a perspective development of the focus detecting optical system shown in FIG. 2. Referring to FIG. 3, three openings are formed on the field mask 10 disposed adjacent to the expected image plane of the photo-taking lens 1, and each of the object images formed adjacent to the three openings is divided into two images by the focus-detection image forming lens 14 and formed onto the focus-detection light receiving portion 15, so that focuses of three points in a photographed image plane are detected.

Figure 4:
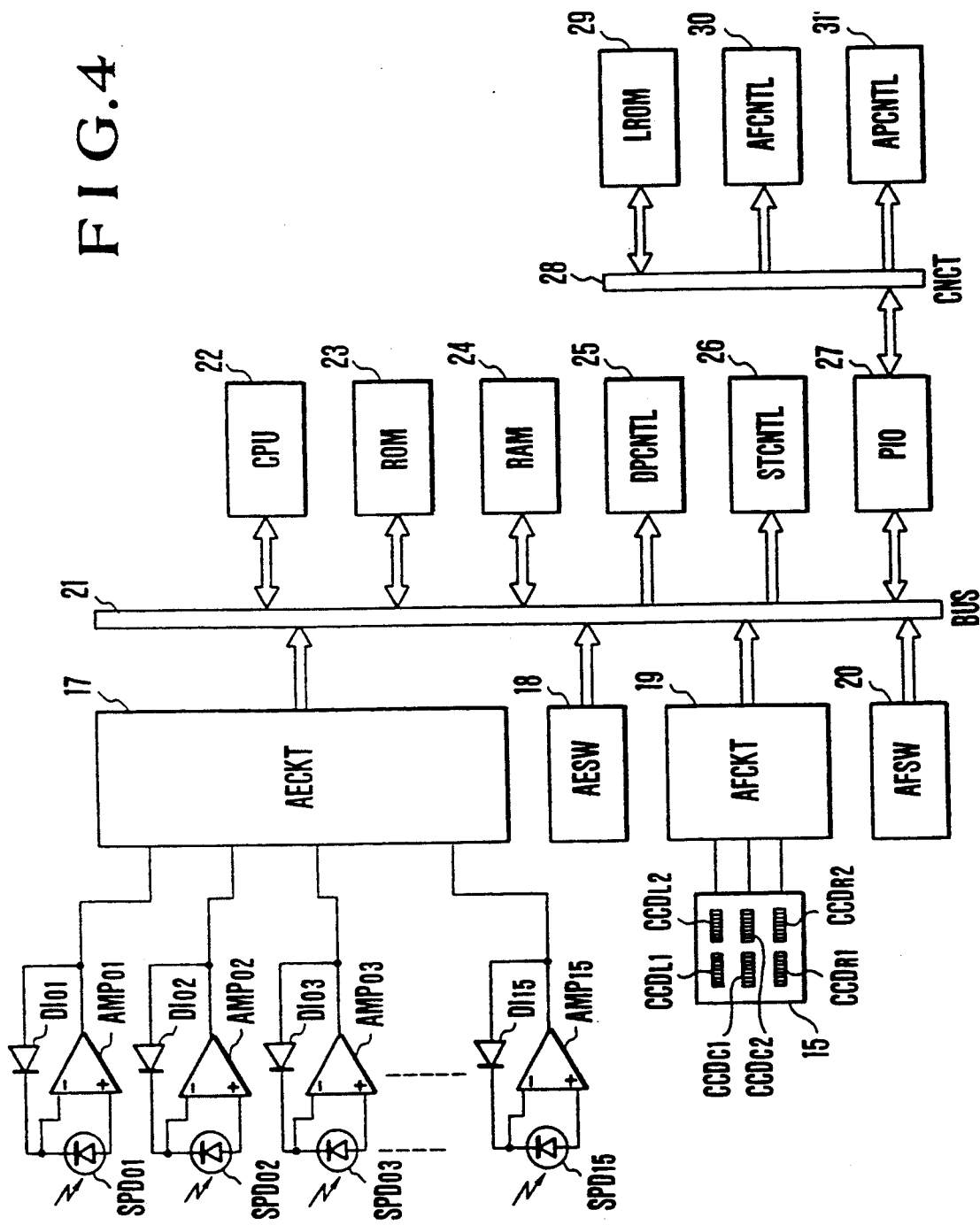
FIG. 4 is a view showing a circuit arrangement of the camera according to this invention.

FIG. 4 is a block diagram showing the structure of a circuit according to the first embodiment of this invention. Referring to FIG. 4, silicon photodiodes (SPD) $SPD_{01}$, $SPD_{02}$ ... $SPD_{15}$ perform light measuring operations for the fifteen light receiving small areas $S_{01}$, $S_{02}$ ... $S_{15}$ shown in FIG. 1 respectively and generate photoelectric currents in accordance with the luminance of each of the small areas. Operational amplifiers $AMP_{01}$, $AMP_{02} \ldots AMP_{15}$ and compression diodes $DI_{01}$, $DI_{02} \ldots DI_{15}$ constitute light receiving means corresponding to the fifteen light receiving small areas shown in FIG. 1 in combination with the silicon photodiodes (SPD). A light measurement circuit (AECKT) 17 converts output signals corresponding to the luminances of the plurality of light receiving small areas from analog to digital respectively and outputs digital signals. A light measurement mode selection switch (AESW) 18 allows an operator to select, according to his intention, either what is called an evaluative light measurement in which a camera automatically determines an exposure suitable for a photographed image plane in accordance with the distribution state of the luminance of the field of view, or a partial light measurement in which the operator determines an exposure based on the luminance signals of a specific area of the field of view and his experiences. Numeral 15 denotes the focus-detection light receiving portion shown in FIG. 3 and $CCD_{L1}$ and $CCD_{L2}$, $CCD_{C1}$ and $CCD_{C2}$, and $CCD_{R}1$ and $CCD_{R}2$ designate three pairs of light receiving element arrays corresponding to the focus detecting fields $S_L$, $S_C$ and $S_R$ shown in FIG. 1 respectively. Only a beam which has passed through two different areas on an exit pupil plane of the photo-taking lens 1 is taken out of a field light formed onto a predetermined area of the photographed image plane, and formed onto one pair of the light receiving element arrays by the optical system shown in FIGS. 2 and 3. The amount of defocus can be detected by comparing the output signals from the pair of light receiving element arrays. A focus detecting circuit (AFCKT) 19, as described above, detects the amounts of defocus of the fields of view corresponding to the three focus detecting fields $S_L$, $S_C$ and $S_R$ shown in FIG. 1 respectively based on the output signals from the three pairs of light receiving element arrays mounted on the focus-detection light receiving portion 15, and outputs information on the three defocus amounts as digital signals. A focus detecting point selection switch (AFSW) 20 enables the operator to select, according to his intention, either an automatic selection mode in which a camera automatically determines a focusing position suitable for the photographed image plane in accordance with the distribution state of the defocus amounts of the fields of view corresponding to the three focus detecting fields $S_L$, $S_C$ and $S_R$ shown in FIG. 1, or an optional selection mode in which the operator selectively determines one of the three focus detecting fields shown in FIG. 1, and it is possible for the focus detecting point selection switch to designate a focus detecting point to be selected in the optional selection mode. In FIG. 4, input signals from the light measurement circuit (AECKT) 17, the light measurement mode selection switch (AESW) 18, the focus detecting circuit (AFCKT) 19 and the focus detecting point selection switch (AFSW) 20 are connected to an internal data bus line (BUS) 21 of a microcomputer and used to control various parts.

Referring to FIG. 4, a central processing unit (CPU) 22 for processing the above input signals by using programs stored in memories and directing operations of control mechanisms, a read-only memory (ROM) 23 for storing programs therein, a random-access memory (RAM) 24 of a work area for calculation, a display control mechanism (DPCNTL) 25, a shutter speed control mechanism (STCNTL) 26 and a generalized input/output port (PIO) 27 are each connected to the internal data bus line (BUS) 21 of the microcomputer. The CPU 22 executes a calculating operation according to the programs stored in the ROM 23 by using the above input signals and accessing the RAM 24, controls the display and the shutter speed by the DPCNTL 25 and the STCNTL 26 based on the calculating operation result, and outputs a signal for controlling the lens to the PIO 27.

Referring to FIG. 4, a connector (CNCT) 28 performs a communication between a camera and a lens. A read-only memory (LROM) 29 stores information inherent in the photo-taking lens, and numerals 30 and 31 denote a focus position control mechanism (AFCNTL) of the photo-taking lens and an aperture control mechanism (APCNTL) of the photo-taking lens, respectively. The LROM 29, the AFCNTL 30 and the APCNTL 31 built in the photo-taking lens are connected to the PIO 27 of the camera through the CNCT 28 so that readout or control operations are performed according to instructions from the CPU 22 of the camera.

In this embodiment, as described above, the display device and the shutter of the camera and the focus position adjustment and the aperture of the photo-taking lens are controlled by using the microcomputer based on the input signals from the light measurement circuit (AESW) 17, the light measurement mode selection switch (AESW) 18, the focus detecting circuit (AFCKT) 19 and the focus detecting point selection switch (AFSW) 20.

Operations of the first embodiment of this invention will now be described with reference to FIGS. 5 to 9.

Figure 5:
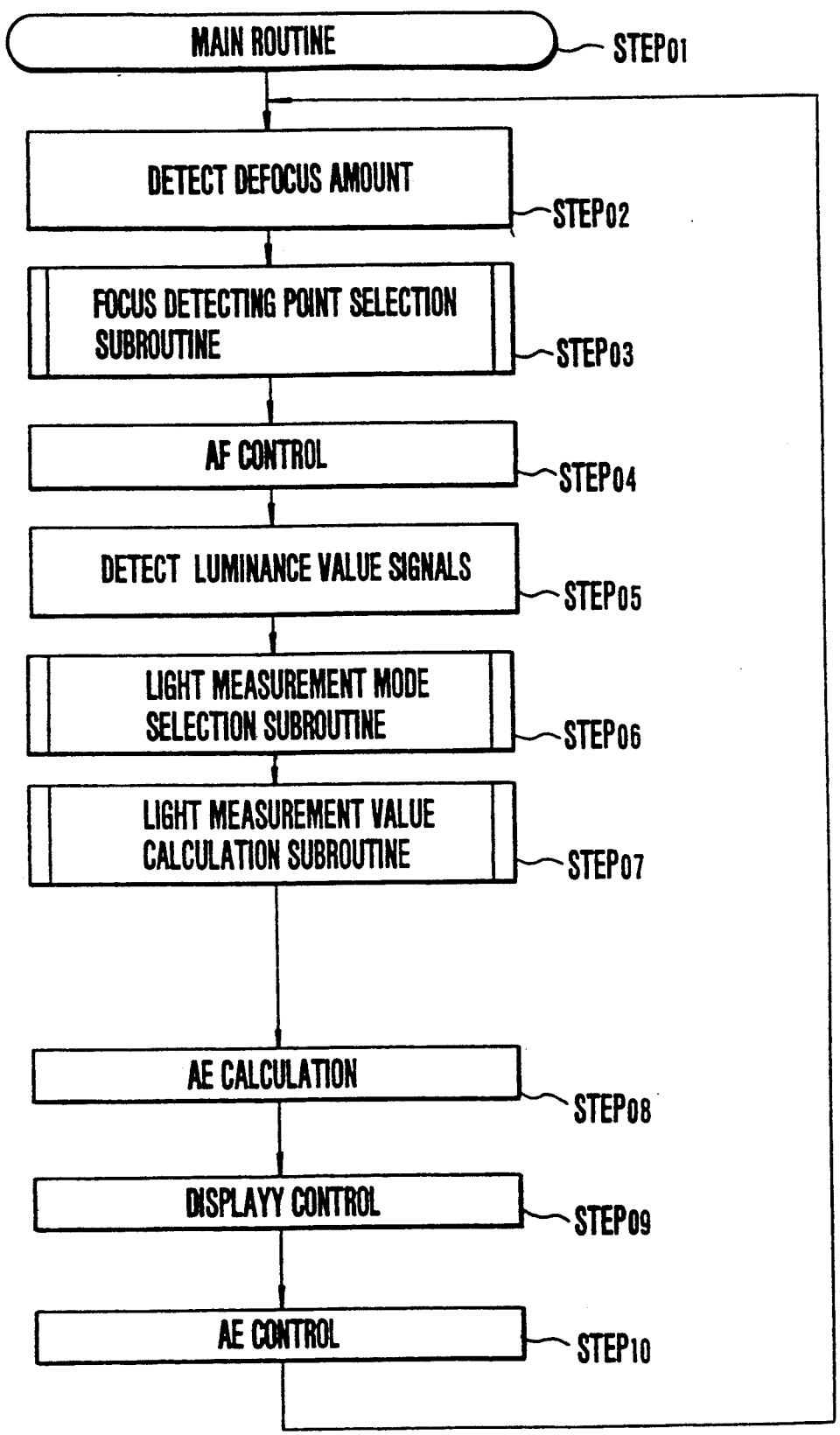

FIGS. 5 to 9 are flowcharts of the first embodiment of this invention, FIG. 5 shows a main routine and FIGS. 6 to 9 show subroutines.

First, the main routine shown in FIG. 5 will be described.

STEP 01: Main Routine

In the camera, the focus position adjustment, the exposure in accordance with the setting of the shutter time and the aperture and the display are controlled by using information corresponding to the luminance of the field of view, information on the preset defocus amount of each of the plurality of focus detecting points, information on the light measurement mode selection based on the operator's intention and information on the focus detecting point selection. Although the main routine includes other matters to handle, such as the control of the drive of the quick-return mirror and the control of a film feeding mechanism, only matters related to the light measurement device or the camera according to this invention are described herein and the description of the other matters is omitted so as to simplify the explanation.

STEP 02:

Signals representing the defocus amount of the three focus detecting points are taken in from the AFCKT 19. The defocus amounts are calculated by detecting differences among outputs from the pairs of the line sensors $CCD_{L1}$ and $CCD_{L2}$, $CCD_{C1}$ and $CCD_{C2}$ and $CCD_{R1}$ and $CCD_{R2}$ respectively corresponding to the focus detecting points and taken in as digital signals.

STEP 03:

This step is a focus detecting point selection subroutine which receives the focus detecting point selection signals from the AFSW 20 and signals related to the defocus amount signals from the AFCKT 19, if the operator selects one of the three focus detecting points, outputs a signal corresponding to the selected focus detecting point, detects a focus detecting point having the nearest object distance based on the signals representing the defocus amounts if the operator selects the automatic selection mode of a focus detecting point by the camera, outputs a signal corresponding to the detected focus detecting point, that is, a focus detecting point signal SEL.

STEP 04:

The defocus amount and the defocus direction to be adjusted are determined based on the signals related to the defocus amounts of the three focus detecting points and the above focus detecting point signal SEL, and the focus of the photo-taking lens is adjusted by the AFCNTL 30.

STEP 05:

Signals corresponding to the luminances of the fifteen small areas are taken in from the AECKT 17 as digital signals.

STEP 06:

This step is a light measurement mode selection subroutine which receives input signals from the AESW 18, and outputs a light measurement mode signal MODE corresponding to the light measurement mode according to the operator's intention. In this embodiment, since the operator selectively determines either the evaluative light measurement or the partial light measurement, the signal corresponding to the light measurement mode input by the operator, that is, the evaluation light measurement or the partial light measurement, is output as the light measurement mode signal MODE as it is. Unlike this embodiment, if it is assumed that a light measuring device in which a camera automatically determines a light measurement mode is used, a signal corresponding to the light measurement mode determined by the camera is output.

STEP 07:

This step is a light measurement value calculation subroutine which appropriately compensates the signals taken in from the AECKT 17 based on information inherent in the photo-taking lens taken in from the LROM 29 and so on, outputs the luminance value signals of the field of view corresponding to the small areas, and furthermore performs a calculation determined based on the above focus detecting point signal STL and the light measurement mode signal MODE by using these plurality of luminance value signals, and which outputs a light measurement value E.

STEP 08:

The shutter speed and the aperture value are determined from the light measurement value E based on the program preset in the camera and are output. It may be possible to switch photographing modes, such as a shutter priority mode and an aperture priority mode, besides the program mode according to the operator's intention. In any case, the shutter speed and the aperture value are determined based on the program thereof.

STEP 09:

Exposure information related to the shutter speed and the aperture value, and, if necessary, focus detecting point selection information, a light measurement mode selection information, a light measurement mode selection information and so on are displayed on a display device of the camera by the DPCNTL 25.

STEP 10:

Based on the shutter speed and the aperture value determined as described above, the shutter speed is controlled by the STCNTL 26 and the aperture of the photo-taking lens is controlled by the APCNTL 31.

After the above STEP 02 to STEP 10, a series of photographing operations in the camera is completed, and the state of STEP 02 is repeated so as to get ready for the next photographing operation.

The subroutines will now be described.

Figure 6:
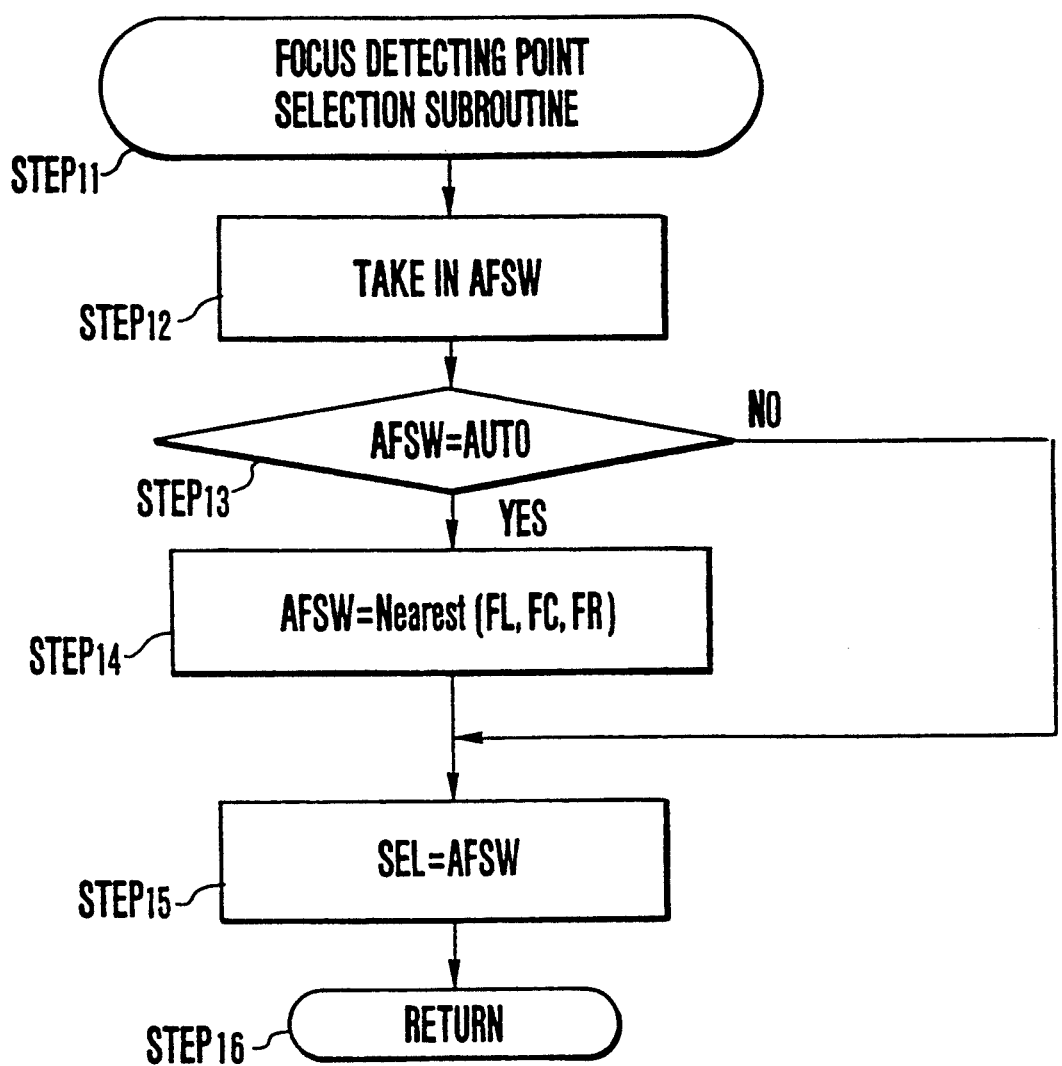

FIG. 6 is a flowchart showing the focus detecting point selection subroutine of STEP 03 shown in FIG. 5.

STEP 11:

The focus detecting point selection subroutine.

STEP 12:

The focus detecting point selection information is taken in from the AFSW 20. If the operator sets an automatic selection of the focus detecting point by the camera, the AFSW 20 outputs a focus detecting point selection signal AUTO, and if the operator selectively sets a focus detecting point, when the focus detecting point $S_L$ positioned on the left side of the photographed image plane is selected, a focus detecting point selection signal FL is output, when the focus detecting point $S_C$ positioned in the center of the photographed image plane is selected, a focus detecting point selection signal FC is output, and when the focus detecting point $S_R$ is selected, a focus detecting point selection signal FR is output.

STEP 13:

It is judged whether or not the focus detecting point selection signal is AUTO. If it is AUTO, STEP 14 is executed, and if it is not AUTO, STEP 15 is executed.

STEP 14:

If the focus detecting point selection signal is AUTO, it is judged which of the three focus detecting points $S_L$, $S_C$ and $S_R$ has the nearest object distance by using the signals related to the defocus amount and direction output from the AFCKT 19, and a signal Nearest (FL, FC, FR) corresponding to the judged focus detecting point is output. If a plurality of focus detecting points are judged to be focus detecting points which have the same distance and the near distance, the signal FC of the center focus detecting point $S_C$ is output.

STEP 15:

A focus detecting point signal SEL is determined in accordance with the focus detecting point determined by the selection by the operator or the automatic selection by the camera. One of the focus detecting point signals FL, FC and FR is output as the focus detecting point signal.

STEP 16:

Return to the main routine.

Figure 7:
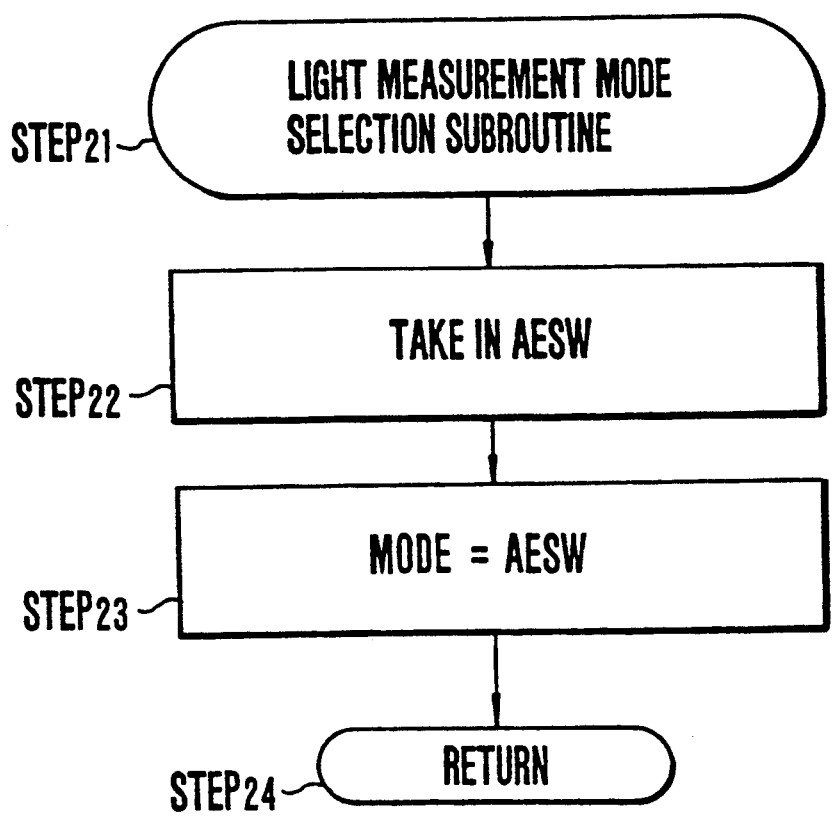

FIG. 7 is a flowchart showing the light measurement mode selection subroutine of STEP 06 shown in FIG. 5.

STEP 21:

The light measurement mode selection subroutine.

STEP 22:

The light measurement mode selection information is taken in from the AESW 18. The AESW 18 is a switch by which the operator selects either the evaluative light measurement or the partial light measurement. If the evaluative light measurement is selected, an output signal EV is output from the AESW 18 and if the partial light measurement is selected, an output signal PA is output.

STEP 23:

The output signal EV or PA of the AESW 18 is output as a light measurement mode signal MODE as it is. In this embodiment, since the selection of the light measurement mode is determined by only the operator's intention, the input signal from the light measurement mode selection switch AESW 18 is output as the light measurement mode signal MODE.

STEP 24:

Return to the main routine.

Figure 8:
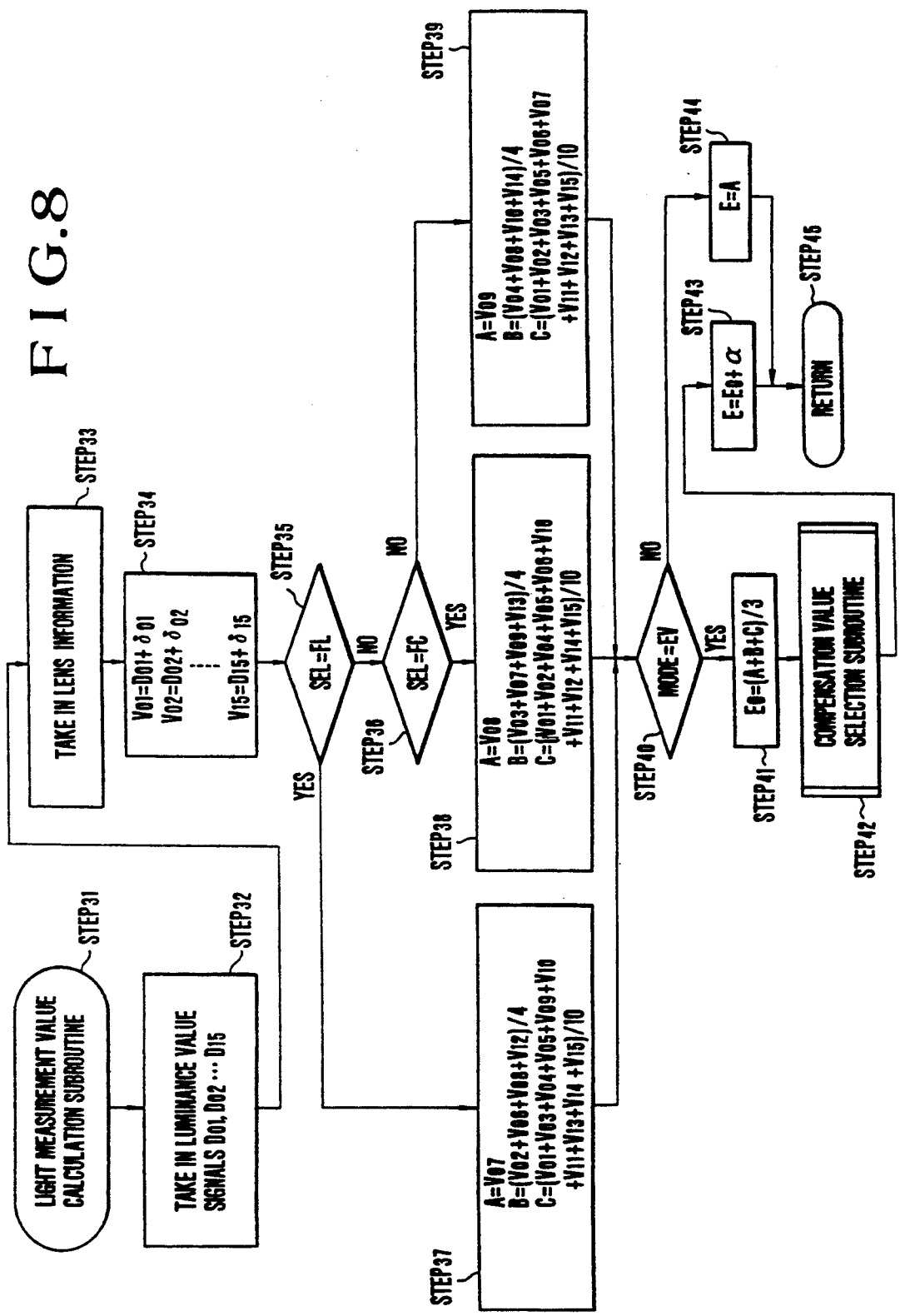

FIG. 8 is a flowchart showing the light measurement value calculation subroutine of STEP 07 shown in FIG. 5.

STEP 31:

The light measurement value calculation subroutine.

STEP 32:

Digital signals $D_{01}, D_{02}, D_{03} \ldots D_{15}$ corresponding to the luminances of the fifteen small areas output from the AECKT 17 are taken in.

STEP 33:

Information inherent in the mounted photo-taking lens is taken in from the LROM 33. The information inherent in the photo-taking leans includes information on the full aperture F number of the photo-taking lens, the focal length, the exit pupil position, the decrease of the peripheral light amount at the full aperture and so on.

STEP 34:

Compensation data $\delta_{01}, \delta_{02} \ldots \delta_{15}$ for compensating the fifteen output signals from the AECKT 17 respectively are determined by using the information inherent in the photo-taking lens, and the luminance value signals of the small areas are calculated. In other words, the luminance value signals $V_{01}, V_{02} \ldots V_{15}$ are calculated according to the following equations so as to be output:

$$V_{01} = D_{01} + \delta_{01}$$

$$V_{02} = D_{02} + \delta_{02}$$

$$V_{01} = D_{01} + \delta_{01}$$
$$V_{02} = D_{02} + \delta_{02}$$
$$\vdots$$
$$V_{15} = D_{15} + \delta_{15}$$

The compensation data $\delta_{01}, \delta_{02} \ldots \delta_{15}$ are selected from a table previously stored in the ROM 23 and determined based on the above information inherent in the photo-taking lens. Furthermore, they can be calculated by operations.

STEP 35:

It is judged whether or not the focus detecting point signal SEL is the signal FL representing the focus detecting point on the left side of the photographed image plane. If SEL=FL, STEP 37 is executed, and if SEL≠FL, STEP 36 is executed.

STEP 36:

It is judged whether or not the focus detecting point signal SEL is the signal FC representing the focus detecting point in the center of the photographed image plane. If SEL is FC, STEP 38 is executed and if SEL is not FC, STEP 39 is executed.

The classification is performed in accordance with the focus detecting point in STEP 35 and STEP 36. If the focus detecting point is on the left, STEP 37 is executed, if the focus detecting point is in the center, STEP 38 is executed, and in another case, that is, when the focus detecting point is on the right, STEP 39 is executed.

In STEP 37 to STEP 39, the small areas divided into fifteen parts are classified into three medium areas including an area adjacent to the focus detecting point, a peripheral area thereof and a further peripheral area thereof, the average of the luminances of the medium areas is calculated an output. At this time, the fifteen small areas are divided so that all of them are contained in any of the medium areas. Signals representing the average luminance values of the area adjacent to the focus detecting point, the peripheral area thereof and the further peripheral area thereof are output as A, B and C respectively.

STEP 37:

Classes of the medium areas when the focus detecting point on the left is selected are determined, and the average luminance value signals A, B and C of the medium areas are output according to the following equations:

$$A = V_{07}$$
$$B = (V_{02} + V_{06} + V_{08} + V_{12})/4$$
$$C = (V_{01} + V_{03} + V_{04} + V_{05} + V_{09} + V_{10} + V_{11} + V_{13} + V_{14} + V_{15})/10$$

STEP 38:

Classes of the medium areas when the focus detecting point in the center is selected are determined, and the average luminance value signals A, B and C of the medium areas are output according to the following equations:

$$A = V_{08}$$
$$B = (V_{03} + V_{07} + V_{09} + V_{13})/4$$
$$C = (V_{01} + V_{02} + V_{04} + V_{05} + V_{06} + V_{10} + V_{11} + V_{12} + V_{14} + V_{15})/10$$

STEP 39:

Classes of the medium areas when the focus detecting point on the right is selected are determined, and the average luminance value signals A, B and C of the medium areas are output according to the following equations:

$$A = V_{09}$$
$$B = (V_{04} + V_{08} + V_{010} + V_{14})/4$$
$$C = (V_{01} + V_{02} + V_{03} + V_{05} + V_{06} + V_{07} + V_{11} + V_{12} + V_{13} + V_{15})/10$$

STEP 40:

It is judged whether or not the light measurement mode signal MODE is a signal EV representing the evaluative light measurement. If MODE=EV, STEP 41 is executed, and if MODE≠EV, that is, if MODE=PA, STEP 44 is executed.

STEP 41:

Since the evaluative light measurement is selected as the light measurement mode, an operation of the evaluative light measurement is performed. By using the average luminance value signal A of the medium are adjacent to the focus detecting point, the average luminance value signal B of the peripheral medium area thereof and the average luminance value signal C of the further peripheral medium area, which are all calculated in STEP 37 to STEP 39, a weighted average luminance value signal $E_0$ of almost the whole image plane, in which the weight of the adjacency of the focus detecting point is high, is calculated according to the following equation:

$$E_0 = (A + B + C)/3$$

Although the luminance value signals A, B and C of the three medium areas are simply added and averaged in the above equation, if the area of the medium area adjacent to the focus detecting point is S(A), the area of the peripheral medium area thereof is S(B) and the area of the further peripheral medium area thereof is S(C), the area ratio of the three medium areas is as follows:

$$S(A):S(B):S(C) = 1:4:10$$

Therefore, the weighted average luminance value, in which the weight of the adjacency of the focus detecting point is high, is calculated according to the above calculation. At this time, the ratio of the weights J(A), J(B) and J(C) of the three medium areas A, B and C are proportional to the reciprocal of the area ratio thereof as follows:

$$J(A):J(B):J(C) = 1:0.25:0.1$$

The calculation for finding $E_0$ shown in the above equation will be referred to as a "focus-detecting-point-weighted average light measurement" in the following description.

STEP 42:

This step is a compensation value selection subroutine for presuming the photographing conditions by using the average luminance value signals of the medium areas found in STEP 37 to STEP 39 and the differences among the average luminance value signals, and selectively determining an exposure compensation value $\alpha$. The details of the subroutine will be described later.

STEP 43:

An automatic exposure compensation, which adds the exposure compensation value $\alpha$ output from the compensation value selection subroutine to the above focus-detecting-point-weighted average light measurement $E_0$ is performed, and the light measurement value E is found according to the following equation:

$$E = E_0 + \alpha$$

The value E found in STEP 41 to STEP 43 is a light measurement value according to the evaluative light measurement of this embodiment.

STEP 44:

When the light measurement mode signal MODE≠EV in STEP 40, that is, when MODE=PA, since the partial light measurement is selected as a light measurement mode, the calculation of the partial light measurement is performed. In the partial light measurement, only the average luminance value signal A of the medium area adjacent to focus detecting point of the average luminance value signals of the medium areas found in STEP 37 to STEP 39 is used and output as a light measurement value E as it is. In short, E=A.

In this embodiment, one of the light receiving small areas including the focus detecting point is selected as the medium area adjacent to the focus detecting point in accordance with the selection of the focus detection point. Therefore, the partial light measurement represents the luminance value signal of the light receiving small area.

STEP 45:

Return to the main routine.

As described above, the light measurement value calculation subroutine can perform a correct light measurement value operation in consideration of the intention of the operator by changing the weight of the light measurement areas or the light measurement areas themselves in correlation to the selection of the focus detecting point in both cases where the evaluative light measurement is selected and where the partial light measurement is selected as a light measurement mode.

FIG. 9 is a flowchart showing the compensation value selection subroutine of STEP 42 shown in FIG. 8.

STEP 51:

The compensation value selection subroutine.

STEP 52:

By using the average luminance value signal A of the medium area adjacent to the focus detecting point, the average luminance value signal B of the peripheral medium area thereof and the average luminance value signal C of the further peripheral medium area thereof, the differences $\Delta BA$ and $\Delta CB$ between the luminance value signals A and B, and B and C of the adjoining medium areas are found according to the following equations:

$$\Delta BA = B - A$$
$$\Delta CB = C - B$$

STEP 53:

The average luminance value signal C of the peripheral medium area is compared with a signal K corresponding to a predetermined luminance (a value for discriminating between the outdoor state and the indoor state), and thereby, an approximate luminance of the field of view is recognized. The average luminance value signal C of the peripheral medium area is used here because the signal is unlikely to be influenced by the reflectance of the main object and the most suitable for presuming the state where the main object is placed. when $C \geq K$, that is, when it is judged that the main object is placed outdoors, STEP 54 is executed, and when $C < K$, that is, when it is judged that the main object is placed indoors, STEP 71 is executed.

STEP 54:

When it is judged that the average luminance of the peripheral area is higher that the predetermined value K and that the outdoor scene is to be photographed, the luminance difference $\Delta BA$ is first compared with a predetermined value $P_{H1}$ having a positive sign. If $\Delta BA < P_{H1}$, STEP 55 is executed, and if $\Delta BA \geq P_{H1}$, STEP 56 is executed.

STEP 55:

If $\Delta BA < P_{H1}$, $\Delta BA$ is further compared with a predetermined value $P_{H2}$ having a negative sign. If $\Delta BA < P_{H2}$, STEP 60 is executed, and if $\Delta BA \geq P_{H2}$, that is, if $P_{H2} \leq \Delta BA < P_{H1}$, STEP 58 is executed In STEP 54 and STEP 55, the luminance difference $\Delta BA$ is classified into the following three types:

$P_{H1} \leq \Delta BA$; $\Delta BA$ is a positive value having a large absolute value.

$P_{H2} \leq \Delta BA < P_{H1}$; $\Delta BA$ has a small absolute value $\Delta BA < P_{H2}$; $\Delta BA$ is a negative value having a large absolute value.

STEP 56:

If $P_{H1} \leq \Delta BA$, $\Delta CB$ is further compared with a predetermined value $Q_{H1}$ having a positive sign. If $\Delta CB < Q_{H1}$, STEP 57 is executed, and if $\Delta CB \geq Q_{H1}$, STEP 62 is executed.

STEP 57:

If $\Delta CB < Q_{H1}$, $\Delta CB$ is further compared with a predetermined value $Q_{H2}$ having a negative sign. If $\Delta CB < Q_{H2}$, STEP 64 is executed, and if $\Delta CB \geq Q_{H2}$, that is, if $Q_{H2} \leq \Delta CB < Q_{H1}$, STEP 63 is executed.

In STEP 56 and STEP 57, the luminance difference $\Delta CB$ is classified into the following three types:

$Q_{H1} \leq \Delta CB$; $\Delta CB$ is a positive value having a large absolute value.

$Q_{H2} \leq \Delta CB < Q_{H1}$; $\Delta CB$ has a small absolute value.

$\Delta CB < Q_{H2}$; $\Delta CB$ is a negative value having a large absolute value.

STEP 58:

If $P_{H2} \leq \Delta BA < P_{H1}$, $\Delta CB$ is further compared with the predetermined value $Q_{H1}$ having a positive sign. If $\Delta CB < Q_{H1}$, STEP 59 is executed, and if $\Delta CB \geq Q_{H1}$, STEP 65 is executed.

STEP 59:

If $\Delta CB < Q_{H1}$, $\Delta CB$ is further compared with the predetermined value $Q_{H2}$ having a negative sign. If $\Delta CB < Q_{H2}$, STEP 67 is executed, and if $\Delta CB \geq Q_{H2}$, that is, if $Q_{H2} \leq \Delta CB < Q_{H1}$, STEP 66 is executed.

In STEP 58 and STEP 59, the luminance difference $\Delta CB$ is classified into the same three types as those shown in STEP 56 and STEP 57.

STEP 60:

If $\Delta BA < P_{H2}$, $\Delta CB$ is further compared with the predetermined clue $Q_{H1}$ having a positive sign. If $\Delta CB < Q_{H1}$, STEP 61 is executed, and if $\Delta CB \geq Q_{H1}$, STEP 68 is executed.

STEP 61:

If $\Delta CB < Q_{H1}$, $\Delta CB$ is further compared with the predetermined value $Q_{H2}$ having a negative value. If $\Delta CB < Q_{H2}$, STEP 70 is executed, and if $\Delta CB \geq Q_{H2}$, that is, if $Q_{H2} \leq \Delta CB > Q_{H1}$, STEP 69 is executed.

In STEP 60 and STEP 61, the luminance difference $\Delta CB$ is classified into the same three types as those shown in STEP 56 and STEP 57.

When it is judged in STEP 53 that the outdoor scene is to be photographed, as descried above, the state of the field of view is classified into nine types so as to select the exposure compensation values $\alpha$ in STEP 54 to STEP 61.

STEP 62 to STEP 70:

The exposure compensation values $\alpha$ suited to the states of the field of view, which are classified in STEP 54 to STEP 61, are output. Only three values $\alpha_{H1}$, $\alpha_{H2}$ and 0 (however, $\alpha_{H1} < \alpha_{H2} < 0$) are used as values of $\alpha$, and one of these three values is selected in this embodiment. The method of determining the exposure compensation value $\alpha$ will be described later.

STEP 71:

When the average luminance value of the peripheral medium area is lower than the predetermined value K and it is judged that the indoor scene is to be photographed, the luminance difference $\Delta BA$ is first compared with a predetermined value $P_{L1}$ having a positive sign. If $\Delta BA \geq P_{L1}$, STEP 72 is executed, and if $\Delta BA \geq P_{L1}$, STEP 73 is executed.

STEP 72:

If $\Delta BA < P_{L1}$, $\Delta BA$ is further compared with a predetermined value $P_{H2}$ having negative sign. If $\Delta BA < P_{L2}$, STEP 77 is executed, and if $\Delta BA \geq P_{L2}$, that is, if $P_{L2} \leq \Delta BA < P_{L1}$, STEP 75 is executed.

The luminance difference $\Delta BA$ is classified into the following three types in STEP 71 and STEP 72:

$P_{L1} \leq \Delta BA$; $\Delta BA$ is a positive value having a large absolute value.

$P_{L2} \leq \Delta BA < P_{L1}$; $\Delta BA$ has a small absolute value.

$\Delta BA < P_{L2}$; $\Delta BA$ is a negative value having a large absolute value.

STEP 73:

If $P_{L1} \leq \Delta BA$, $\Delta CB$ is further compared with a predetermined value $Q_{L1}$ having a positive sign. If $\Delta CB < Q_{L1}$, STEP 74 is executed, and if $\Delta CB \geq Q_{L1}$, STEP 79 is executed.

STEP 74:

If $\Delta CB < Q_{L1}$, $\Delta CB$ is further compared with a predetermined value $Q_{L2}$ having a negative sign. If $\Delta CB < Q_{L2}$, STEP 81 is executed, and if $\Delta CB \geq Q_{L2}$, that is, if $Q_{L2} \leq \Delta CB < Q_{L1}$, STEP 80 is executed.

The luminance difference $\Delta CB$ is classified into the following three types in STEP 73 and STEP 74:

$Q_{L1} \leq \Delta CB$; $\Delta CB$ is a positive value having a large absolute value.

$Q_{L2} \leq \Delta CB < Q_{L1}$; $\Delta CB$ has a small absolute value.

$\Delta CB < Q_{L2}$; $\Delta CB$ is a negative value having a large absolute value.

STEP 75:

If $P_{L2} \leq \Delta BA < P_{L1}$, $\Delta CB$ is further compared with the predetermined value $Q_{L1}$ having a positive sign. If $\Delta CB < Q_{L1}$, STEP 76 is executed, and if $\Delta CB \geq Q_{L1}$, STEP 82 is executed.

STEP 76:

If $\Delta CB < Q_{L1}$, $\Delta CB$ is further compared with the predetermined value $Q_{L2}$ having a negative sign. If $\Delta CB < Q_{L2}$, STEP 84 is executed, and if $\Delta CB \geq Q_{L2}$, that is, if $Q_{L2} \leq \Delta CB < Q_{L1}$, STEP 83 is executed.

In STEP 75 and STEP 76, the luminance difference $\Delta CB$ is classified into the same three types as those shown in STEP 73 an STEP 74.

STEP 77:

If $\Delta BA < P_{L2}$, $\Delta CB$ is further compared with the predetermined value $Q_{L1}$ having a positive sign. If $\Delta CB < Q_{L1}$, STEP 78 is executed, and if $\Delta CB \geq Q_{L1}$, STEP 85 is executed.

STEP 78:

If $\Delta CB < Q_{L1}$, $\Delta CB$ is further compared with the predetermined value $Q_{L2}$ having a negative sign. If $\Delta CB < Q_{L2}$, STEP 87 is executed, and if $\Delta CB \geq Q_{L2}$, that is, if $Q_{L2} \leq \Delta CB < Q_{L1}$, STEP 86 is executed.

In STEP 77 and STEP 78, the luminance difference $\Delta CB$ is classified into the same three types as those in STEP 73 and STEP 74.

When it is judged in STEP 53 that the indoor scene is to be photographed, as described above, the state of the field of view is classified into nine types in STEP 71 to STEP 78 so as to select the exposure compensation values $\alpha$.

STEP 79 to STEP 87:

The exposure compensation values $\alpha$ suited to the states of the field of view, which are classified in STEP 71 to STEP 78, are output. Only three values $\alpha_{L1}$, $\alpha_{L2}$ and 0 (however, $\alpha_{L1} < 0 < \alpha_{L2}$) are used as values of $\alpha$, and one of these three values is selected in this embodiment. The method of determining the exposure compensation value $\alpha$ will be described later.

STEP 88

Return to the light measurement value calculation subroutine.

In the compensation value selection subroutine, the states of the field of view are presumed as described above, and a correct compensation value $\alpha$ is output.

The method of determining the exposure compensation value $\alpha$ will now be described. The eighteen types of states classified in STEP 62 to STEP 70 and STEP 79 to STEP 87 in FIG. 9 are expressed on a coordinate plane whose coordinate axes are $\Delta BA$ and $\Delta CB$ as shown in FIGS. 10(a) and 10(b). The luminance value signals A, B and C of the medium areas in the states in STEP 62 to STEP 70 and STEP 79 to STEP 87 shown in FIG. 9 are expressed in bar graphs as shown in FIGS. 11(a) and 11(b). The focus-detecting-point-weighted average exposure measurement value $E_0$, the exposure compensation value $\alpha$ and the evaluative light measurement value E in each state are also schematically shown in FIGS. 11(a) and 11(b). The states of the field of view and the method of determining the exposure compensation value $\alpha$ in each condition will now be described with reference to FIGS. 10(a), 10(b), 11(a) and 11(b).

(a) When $K \leq C$: Outdoor Scene (a-i) $P_{H1} < \Delta BA$, $Q_{H1} < \Delta CB$ (STEP 62)

As shown in FIG. 10(a), $\Delta BA$ is larger than the predetermined positive value $P_{H1}$, $\Delta CB$ is larger than the predetermined positive value $Q_{H1}$ and the luminance distribution is shown in (i) of FIG. 11(a). In such a case, since the luminance of the background is high and the luminance of the main object portion is relatively low, it can be generally supposed that a backlight scene is to be photographed. In addition, since the luminance value signals A, B and C differ stepwise, it seems that the main object placed adjacent to the focus detecting point exists in both the area which outputs the luminance value signal A and a part of the area which outputs the luminance value signal B. In such luminance distribution, although the focus-detecting-point-weighted average light measurement value $E_0$ is an output as illustrated, it is preferable to output the evaluative light measurement value E by using the compensation value $\alpha_{H1}$ having a negative sign and a relatively large absolute value as shown in (i) of FIG. 11(a) in order to obtain a correct exposure while sufficiently considering the luminance of the above main object and somewhat considering the luminance of the background.

(a-ii) $P_{H1} < \Delta BA$, $Q_{H2} < \Delta CB \leq Q_{H1}$ (STEP 63)

As shown in FIG. 10(a), $\Delta BA$ is larger than the predetermined positive value $P_{H1}$ and $\Delta CB$ is larger than the predetermined negative value $Q_{H2}$ and smaller than the predetermined positive value $Q_{H1}$, and the luminance distribution is shown in (ii) of FIG. 11(a). In such a case, it can be also supposed that a backlight scene is to be photographed in the same manner as in the case (i). As for variations in the luminance value signals, only the luminance value signal A is relatively low, therefore it seems that the main object is placed in only the area which outputs the luminance value signal A. In such a case, the size of the main object seems to be almost the same as that of the area which outputs the luminance value signal A or a little smaller than the area. In the former case, the luminance difference $\Delta BA$ is relatively large, and in the latter case, the luminance value signal A itself is already influenced by the luminance of the background and the luminance difference $\Delta BA$ is relatively small. In both cases, if it is detected that the luminance difference $\Delta BA$ is larger than the predetermined positive value $P_{H1}$ and the main object having a relatively low luminance is placed adjacent to the focus detecting point, it is preferable to output the evaluative light measurement value E by using almost the same compensation value $\alpha_{H1}$ as that in the case (i) instead of the focus-detecting-point-weighted average light measurement value $E_0$ while sufficiently considering the luminance of the main object and somewhat considering the luminance of the background.

(a-iii) $P_{H1} < \Delta BA$, $\Delta CB \leq Q_{H2}$ (STEP 64)

As shown in FIG. 10(a), $\Delta BA$ is larger than the predetermined positive value $P_{H1}$, $\Delta CB$ is smaller than the predetermined negative value $Q_{H2}$ and the luminance distribution is shown in (iii) of FIG. 11(a). Such luminance distribution appears when the object locally having a high luminance exists in the area which outputs the luminance value signal B. In such a case, if a compensation is made to eliminate the influences of the locally high-luminance object, a correct exposure can be given to the whole image plane. Therefore, it is preferable to output the evaluative light measurement value E by using the compensation value $a_{H2}$ having a negative sign and a relatively small absolute value as shown in (iii) of FIG. 11(a).

(a-iv) $P_{H2} < \Delta BA \leq P_{H1}$, $Q_{H1} < \Delta CB$ (STEP 65)

As shown in FIG. 10(a), $\Delta BA$ is larger than the predetermined negative value $P_{H2}$ and smaller than the predetermined positive value $P_{H1}$, $\Delta CB$ is larger than the predetermined positive value $Q_{H1}$, and the luminance distribution is as shown in (iv) of FIG. 11(a). In such a case, it can be also supposed that a backlight scene is to be photographed. As for variation in the luminance value signals, the luminance value signals A and B are lower than the luminance value signal C, and it seems that the main object is placed over a wide range of the area which outputs the luminance value signal A and the area which outputs the luminance value signal B. In the case of such luminance distribution, it is preferable to output a light measurement value which gives more importance to the area which is judged to be a main object. However, since the focus-detecting-point-weighted average light measurement value $E_0$ is somewhat influenced by the luminance of the background area having a high luminance as shown in the figure, it is preferable to output the evaluative light measurement value E by using a compensation value $a_{H2}$ almost equivalent to that in the case (iii).

(a-v) $P_{H2} < \Delta BA \leq P_{H1}$, $Q_{H2} < \Delta CB \leq Q_{H1}$ (STEP 66)

As shown in FIG. 10(a), $\Delta BA$ is larger than the predetermined negative value $P_{H2}$ and smaller than the predetermined positive value $P_{H1}$, $\Delta CB$ is larger than the predetermined negative value $Q_{H2}$ and smaller than the predetermined positive value $Q_{H1}$, and the luminance difference is small as shown in (v) of FIG. 11(a). It is supposed that such luminance distribution appears in the case of a backlight scene similar to the case (ii), where the size of the main object is even smaller and the detection of the luminance of the main object is difficult, and in the case of a landscape scene, similar to the case (iv), where the size of the main object is even larger and almost the whole image plane corresponds to the main object. Even in the backlight scene where the main object is small, it is preferable to handle the scene as a backlight landscape scene under such conditions. Therefore, it is preferable to make a compensation value "0" and output the focus-detecting-point-weighted average measurement value $E_0$ as an evaluative light measurement value E so as to give a correct exposure to the whole image plane.

(a-vi) $P_{H2} < \Delta BA \leq P_{H1}$, $\Delta CB \leq Q_{H2}$ (STEP 67)

As shown in FIG. 10(a), $\Delta BA$ is larger than the predetermined negative value $P_{H2}$ and smaller than the predetermined positive value $P_{H1}$ $\Delta CB$ is smaller than the predetermined negative value $Q_{H2}$, and the luminance distribution is as shown in (vi) of FIG. 11(a). Such luminance distribution appears when a main object having an extremely high luminance is placed in both the area which outputs the luminance value signal A and the area which outputs the luminance value signal B, and in more cases, the main object, which has an extremely high luminance with respect to the luminance value signal C representing a general outdoor luminance, has a high reflectance (is whitish). Therefore, in such a case, it is preferable to output the evaluative light measurement value E by suing a compensation value $aH_2$ almost equivalent to that in the case (iii), as shown in the figure, in order to express the main object part so that the main object is whitish to some extent.

(a-vii) $\Delta BA \leq P_{H2}$, $Q_{H1} < \Delta CB$ (STEP 68)

As shown in FIG. 10(a), $\Delta BA$ is smaller than the predetermined negative value $P_{H2}$, $\Delta CB$ is larger than the predetermined positive value $Q_{H1}$, and the luminance distribution is as shown in (vii) of FIG. 11(a). Such luminance distribution appears when the main object itself has an extremely high contrast or in the case of a landscape scene having a specific composition. However, neither of the cases are so general and used so frequently. In these cases, it is preferable to give a correct exposure to the whole image plane, to make a compensation value "0" in the same manner as the case (v), and to output the focus-detecting-point-weighted average light measurement value $E_0$ as an evaluative light measurement value E.

(a-viii) $\Delta BA \leq P_{H2}$, $Q_{H2} < \Delta CB \leq Q_{H1}$ (STEP 69)

As shown in FIG. 10(a), $\Delta BA$ is smaller than the predetermined negative value $P_{H2}$, $\Delta CB$ is larger than the predetermined negative value $Q_{H2}$ and smaller than the predetermined positive value $Q_{H1}$, and the luminance distribution is as shown in (viii) of FIG. 11(a). In such a case, it can be supposed that the main object has a high reflectance (is whitish) in the same manner as in the case (vi). Furthermore, it can be supposed that the size of the main object part is smaller compared with that in the case (vi). Although, it is necessary to express the main object part to be whitish to some extent in the case of such a main object, since an almost desired exposure can be given by suing the focus-detecting-point-weighted average light measurement value $E_0$ as shown in the figure, it is preferable to output the evaluative light measurement value E by using a compensation value "0".

(a-ix) $\Delta BA \leq P_{H2}$, $\Delta CB \leq Q_{H2}$ (STEP 70)

As shown in FIG. 10(a), $\Delta BA$ is smaller than the predetermined negative value $P_{H2}$, $\Delta CB$ is smaller than the predetermined negative value $Q_{H2}$, and the luminance distribution is as shown in (ix) of FIG. 11(a). In such a case, it can also be supposed that the main object is the same as that in the case (vi) and it can be judged that the size of the main object is intermediate between those of the cases (vi) and (viii). Furthermore, the luminance of the area adjacent to the focus detecting point is even higher compared with those of the cases (vi) and (viii), and it is judged that a main object having a further high reflectance is placed or that any light source is placed. Although the main object portion is expressed to be whitish to some extent even if the focus-detecting-point-weighted average light measurement value $E_0$ is used as shown, it is preferable to output an evaluative light measurement value E by using a compensation value $A_{H2}$ almost equivalent to that of the case (iii) in order to express the main object portion to be more whitish in consideration of the balance between the main object part and the peripheral part thereof in the image plane.

(b) when C<K: Indoor Scene

(b0i) $P_{L1} < \Delta BA$, $Q_{L1} < \Delta CB$ (STEP 79)

As shown in FIG. 10(b), $\Delta BA$ is larger than the predetermined positive value $P_{L1}$, $\Delta CB$ is larger than the predetermined positive value $Q_{L1}$, and the luminance distribution is as shown in (i) of FIG. 11(b). In such a case, since the luminance of the background portion is not so high and the luminance of the main object portion is considerably lower than that of the background portion, a scene where a main object is placed at a position not illuminated by an indoor illumination light, a scene where an object having a somewhat low reflectance (being blackish) is placed adjacent to the focus detecting point, and the like, are presumed. Furthermore, it seems that the main object is so big as to exist in the area which outputs the luminance value signal A and a part of the area which outputs the luminance value signal B in the same manner as in the case (a-i). In order to express the states of the field of view which, the operator observes, according to his sense under such conditions, it is preferable to give such an exposure as to express the main object portion to be somewhat blackish to he extent that details thereof can be reproduced. Therefore, as shown in (i) of FIG. 11(b), it is preferable to find an evaluative light measurement value E by suing a compensation value $a_{L1}$, having a negative sign and a relatively small absolute value, with respect tot he focus-detecting-point-weighted average light measurement vale $E_0$.

(b-ii) $P_{L1} < \Delta BA$, $Q_{L2} < \Delta CB \leq Q_{L1}$ (STEP 80)

As shown in FIG. 11(b), $\Delta BA$ is larger than the predetermined positive value $P_{L1}$, $\Delta CB$ is larger than the predetermined negative value $Q_{L2}$ and smaller than the predetermined positive vale $Q_{L1}$, and the luminance distribution is as shown in (ii) of FIG. 11(b). In such a case, it can be also supposed that a scene where the main object portion is dark is to be photographed in the same manner as in the case (i). It can be judged that the size of the main object is a little smaller than that of the case (i) in the same manner as in the case (a-ii). In such a case, it is also preferable to express the main object portion to be somewhat blackish. Therefore, as shown in the figure, it is preferable to output an evaluative light measurement value E by using a compensation value $a_{L1}$ almost equivalent to that of the case (i).

(b-iii) $P_{L1} < \Delta BA$, $\Delta CB \leq Q_{L2}$ (STEP 81)

As shown in FIG. 11(b), $\Delta BA$ is larger than the predetermined positive value $P_{L1}$, $\Delta CB$ is smaller than the predetermined negative value $Q_{L2}$, and the luminance distribution is as shown in (iii) of FIG. 11(b). Such luminance distribution appears when a main object which has locally a high luminance, like a light source for illumination or the like, exists in the area which outputs the luminance value signal B. In such a case, since the focus-detecting-point-weighted average light measurement value $E_0$ is influenced by the high-luminance area and gives an exposure suited to such a scene which expresses the main object portion to be somewhat blackish, as shown in the figure, it is preferable to output the focus-detecting-point-weighted average light measurement value $E_0$ as the evaluative light measurement value E with a compensation value "0".

(b-iv) $P_{L2} < \Delta BA \leq P_{L1}$, $Q_{L1} < \Delta CB$ (STEP 82)

As shown in FIG. 10(b), $\Delta BA$ is larger than the predetermined negative value $P_{L2}$ and smaller than the predetermined positive value $P_{L1}$, $\Delta CB$ is larger than the predetermined positive value $Q_{L1}$ and the luminance distribution is as shown in (iv) of FIG. 11(b). In such a case, it can be also supposed that a scene where the main object portion is dark is to be photographed in the same manner as in the case (i). Furthermore, it can be judged that the main object is larger than that of the case (i) and placed over a wide range in the photographed image plane in the same manner as in the case (a-iv). Although it is preferable to express the main object portion to be somewhat blackish in the same manner as in the case(i) even in such a case, since the focus-detecting-point-weighted average light measurement value $E_0$ is a value to give a considerably proper exposure as it is, it is preferable to output the focus-detecting-point-weighted average light measurement value $E_0$ as an evaluative light measurement value E with a compensation value "0".

(b-v) $P_{L2} < \Delta BA \leq P_{L1}$, $Q_{L2} < \Delta CB \leq Q_{L2}$ (STEP 83)

As shown in FIG. 10(b), $\Delta BA$ is larger than the predetermined negative value $P_{L2}$ and smaller than the predetermined positive value $P_{L1}$, $\Delta CB$ is larger than the predetermined negative value $Q_{L2}$ and smaller than the predetermined positive value $Q_{L1}$, and the luminance distribution is as shown in (v) of FIG. 11(b). Such luminance distribution appears in the same condition as that of the case (a-v). In particular, in many indoor scenes, bright portions and dark portions exist together in each area and when the luminance value signals A, B and C are output from the medium areas, the luminance difference becomes small as a result. In such cases, it is preferable to output the focus-detecting-point-weighted average light measurement value $E_0$ as an evaluative light measurement value E with a compensation value "0" so as to give a correct exposure to the whole image plane in the same manner as in the case (a-v).

(b-vi) $P_{L2} < \Delta BA \leq P_{L1}$, $\Delta CB \leq Q_{L2}$ (STEP 84)

As shown in FIG. 10(b), $\Delta BA$ is larger than the predetermined negative value $P_{L2}$ and smaller than the predetermined positive value $P_{L1}$, $\Delta CB$ is smaller than the predetermined negative value $Q_{L2}$, and the luminance distribution is as shown in (vi) of FIG. 11(b). Such luminance distribution appears when the main object exists in both the area which outputs the luminance value signal A and the area which outputs the luminance value signal B and is illuminated with an illumination light, and the luminance thereof is relatively high compared with those of other background areas, and so on. In such a case, it is preferable to output the evaluative light measurement value E by using a compensation value $a_{L2}$ having a positive sign as shown in order to give a correct exposure which gives importance to the main object portion while somewhat considering the luminance value signal of the background portion.

(b-vii) $\Delta BA \leq P_{L2}$, $Q_{L1} < \Delta CB$ (STEP 85)

As shown in FIG. 10(b), $\Delta BA$ is smaller than the predetermined negative value $P_{L2}$, $\Delta CB$ is larger than the predetermined positive value $Q_{L1}$, and the luminance distribution is as shown in (vii) of FIG. 11(b). Such luminance distribution appears in specific conditions like the case (a-vii) and it is preferable to give a correct exposure to the whole image plane in the same manner as in the case (a-vii), and therefore, to output the focus-detecting-point-weighted average light measurement value $E_0$ as an evaluative light measurement value E with a compensation value "0".

(b-viii) $\Delta BA \leq P_{L2}$, $Q_{L2} < \Delta CB \leq Q_{L1}$ (STEP 86)

As shown in FIG. 10(b), $\Delta BA$ is smaller than the predetermined negative value $P_{L2}$, $\Delta CB$ is larger than the predetermined negative value $Q_{L2}$ and smaller than the predetermined positive value $Q_{L1}$, and the luminance distribution is as shown in (viii) of FIG. 11(b). It can be supposed that such a case is a scene where only the luminance of the main object portion is relatively high due to the illumination light or the like in the same manner as the case (vi). Furthermore, it can be judged that the size of the main object portion is smaller compared with that the case (vi) based on the distribution state of the luminance signals. In such a case, it is preferable to output an evaluative light measurement value E by using a compensation value $\alpha_{L2}$ almost equivalent to that of the case (vi) with respect to the focus-detecting-point-weighted average light measurement value $E_0$ as shown in order to give an exposure while giving importance to the luminance value signal of the main object portion and considering the luminance value signal of the background portion.

(b-ix) $\Delta BA \leq P_{L2}$, $\Delta CB \leq Q_{L2}$ (STEP 87)

As shown in FIG. 10(b), $\Delta BA$ is smaller than the predetermined negative value $P_{L2}$, $\Delta CB$ is smaller than the predetermined negative value $Q_{L2}$, and the luminance distribution is as shown in (ix) of FIG. 11(b). In such a case, it is also supposed that the same main object as that in the case (vi) exists, and it is judged that the size of the main object is intermediate between those of the cases (vi) and (viii). Furthermore, the luminance of the area adjacent to the focus detecting point is even higher compared with those in the cases (vi) and (viii), and it can be supposed that a scene, where the main object illuminated by an illumination light or the like has a somewhat high luminance (is somewhat whitish) or where a light source for illumination is placed behind or near the main object, is to be photographed. In such a case, it is preferable to express the area adjacent to the focus detecting point as a whitish area and to output the evaluative light measurement value E by using a compensation value $\alpha_{L2}$ almost equivalent to that of the case (vi) in order to give an exposure while giving importance to the main object portion and considering the balance of the whole image plane.

As described above, in this embodiment, the states of the field of view are classified into eighteen types and an optimal exposure compensation value $\alpha$ in each state is selectively determined. The relationship in magnitude among the above compensation values is as follows:

$$\alpha_{H1} < \alpha_{H2} < 0$$

$$\alpha_{L1} < 0 < \alpha_{L2}$$

Although the relationship in magnitude between $\alpha_{H1}$ or $\alpha_{H2}$ and $\alpha_{L1}$ differs in accordance with the setting of the predetermined values $P_{H1}$, $P_{H2}$, $Q_{H1}$, $Q_{H2}$, $P_{L1}$, $P_{L2}$, $Q_{L1}$ and $Q_{L2}$, if the luminance differences $\Delta BA$ and $\Delta CB$ are almost equivalent to each other, it is generally desirable that $\alpha_{H2} < \alpha_{L1}$.

Although the field of view is divided into nine parts with respect to the luminance differences $\Delta BA$ and $\Delta CB$ respectively in the above-mentioned method of determining the exposure compensation value $\alpha$ in order to simplify the explanation, for example, like the cases (ii) and (v) shown in FIGS. 11(a) and 11(b), it is preferable to minutely classify the field of view particularly in the state where the selection result of the exposure compensation value $\alpha$ greatly differs in accordance with the luminance difference. Furthermore, it is also preferable to perform a minute classification in the case where the field of view is classified based on the luminance signal C. Such minute classification of the field of view makes it possible to reduce variations in the exposure when the photograph composition lightly changes and to obtain a stable exposure.

A light measuring device, which presumes the state of the field of view by using the above luminance differences $\Delta BA$ and $\Delta CB$ and the luminance value signal C of the peripheral portion in the photographed image plane so as to output a correct light measurement value, is disclosed in U.S. Pat. No. 4,786,935.

The focus-detecting-point-weighted average light measurement in this embodiment is a calculation for finding an arithmetical averaging value, whose coefficient is the importance of the luminance value signals of the divided small areas, in accordance with the position of the selected focus detecting point. The coefficients as the importance of the areas when the left focus detecting point is selected, when the center focus detecting point is selected and when the right focus detecting point is selected, are shown in FIGS. 12(a), 12(b) and 12(c) respectively. It is natural the combinations of the coefficients of the importance are not limited thereto.

Figure 13A:
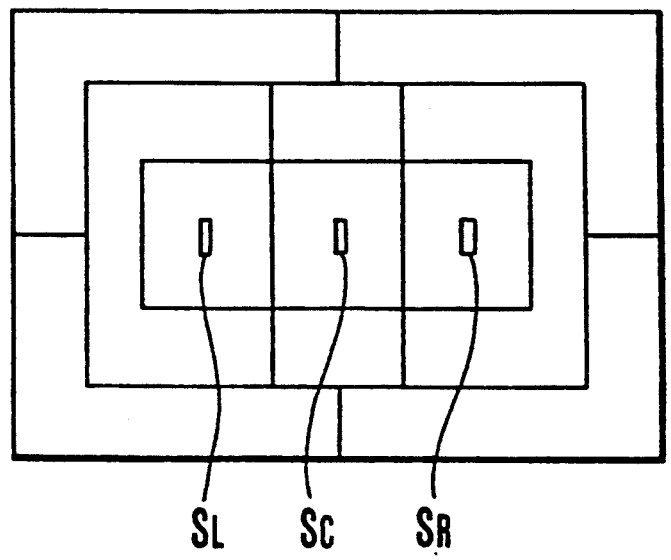
FIGS. 13($a$) and 13($b$) are views showing the shape of a divided light receiving portion for light measurement according to another embodiment of this invention.
Figure 13B:
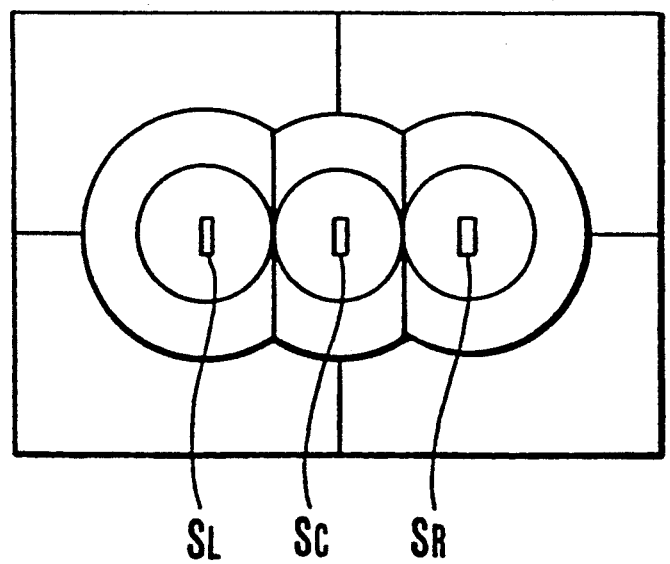

FIGS. 13(a) and 13(b) each show the shape of a divided light receiving portion for light measurement in a second embodiment of this invention. Although the light-measurement light receiving portion is divided into fifteen small areas which are equally shaped in the first embodiment of this invention, it may be divided into small areas, which are different in shape and area, as shown in FIGS. 13(a) and 13(b). In such a case, care should be taken so that the areas of the medium areas are not greatly changed by the selection of the focus detecting point when classifying the luminance value signals of the small areas into those of the medium areas.

Although the field of view is divided into eleven small areas so as to perform a light measuring operation in FIGS. 13(a) and 13(b), the reduction of the number of division can simplify a light measurement circuit and reduce the cost of the light-measurement light receiving element. Furthermore, if the light-measurement light receiving portion is divided as shown in FIG. 13(a) and 13(b), it is possible to reduce a substantial division number of the light-measurement light receiving portion by connecting the light receiving small areas, arranged in the peripheral portion of the photographed image plane, in series. The art for reducing the division number of the light-measurement light receiving portion is disclosed in U.S. Pat. No. 4,704,024.

As described above, in the above embodiments, the field of view is divided into a plurality of small areas so as to detect the luminance of each of the small areas, the small areas are classified based on the combination in accordance with a selected focus detecting area and a light measurement value is found by changing the weight of the classified areas. Therefore, it is possible to provide a camera capable of stably obtaining a correct light measurement value in a structure suited to a camera which can separately detect focuses of a plurality of areas in the field of view.

In addition, since the luminance differences among the classified areas are found and a light measurement value is found with reference to information on the luminance differences in the above embodiments, a correct light measurement value in accordance with the size of a main object and a judged scene can be obtained.

What is claimed is:

1. A camera comprising:
   (a) detecting means for dividing a field of view into a plurality of small areas and detecting the luminance of each of said small areas;
   (b) focus detecting means capable of detecting focuses of a plurality of focus detecting areas in said field of view;
   (c) setting means for classifying said plurality of small areas into different preset combinations in accordance with a selection of said focus detecting areas; and
   (d) calculation means for calculating a light measurement value by using the luminance of two or more of said small areas obtained by said detecting means and changing degrees of weight on said small areas classified by said setting means.

2. A camera according to claim 1, wherein said setting means classifies said plurality of small areas into at least three areas including a first area having said selected focus detecting area therein, a second area surrounding said first area, and a third area surrounding said second area.

3. A camera according to claim 1, wherein said focus detecting means can detect the focuses of said plurality of focus detecting areas separately.

4. A camera according to claim 1, wherein the selection of said one focus detecting area is performed in a manual mode in which an operator selects one of said plurality of focus detecting areas or in an automatic mode in which one of said plurality of focus detecting areas is selected according to a preset program.

5. A camera according to claim 4, wherein a focus detecting area having the nearest object distance is selected according to said program in said automatic mode.

6. A camera according to claim 3, wherein said calculation means effects a calculation by giving a small weight in luminance to the areas apart from said selected focus detecting area.

7. A camera according to claim 2, wherein said calculation means effects a calculation by giving a greater weight in luminance to said first area than said second or third area.

8. A camera according to claim 3, wherein said focus detecting means has a plurality of pairs of focus detecting devices and each of said pairs can detect a focusing state and an amount of defocus of an object in the respective focus detecting areas.

9. A camera according to claim 1, wherein said setting means selects a preset specific focus detecting area when a plurality of focus detecting areas are selected and classifies said plurality of small areas in accordance with said specific focus detecting area.

10. A camera comprising:
    (a) detecting means for dividing a field of view into a plurality of small areas and detecting the luminance of each of said small areas;
    (b) focus detecting means capable of detecting focuses of a plurality of focus detecting areas in said field of view;
    (c) setting means for classifying said plurality of small areas in accordance with a selection of one of said focus detecting areas, said setting means classifying said plurality of small areas into at least a first area including said selected focus detecting area, a second area surrounding said first area and a third area surrounding said second area;
    (d) luminance difference detecting means for finding information on the luminance differences between adjoining areas of said first, second and third areas; and
    (e) calculation means for calculating a light measurement value by using the luminance of each of said small areas obtained by said detecting means and said luminance difference information found by said luminance difference detecting means.

11. A camera according to claim 10, wherein said focus detecting means can detect the focuses of said plurality of focus detecting areas separately.

12. A camera according to claim 10, wherein the selection of said focus detecting area is performed in a manual mode in which an operator selects one of said plurality of focus detecting areas or in an automatic mode in which one of said plurality of focus detecting areas is selected according to a preset program.

13. A camera according to claim 12, wherein a focus detecting area having the nearest object distance is selected according to said program in said automatic mode.

14. A camera according to claim 11, wherein said focus detecting means has a plurality of pairs of focus detecting devices and each of said pairs can detect a focusing state and an amount of defocus of an object in the respective focus detecting areas.

15. A camera according to claim 10, wherein said first, second, and third areas classified by said setting means are respectively constituted by different combinations of said small areas in accordance with the selection of one of said focus detecting areas.

16. A camera according to claim 15, wherein the area ratio of said first, second, and third areas is substantially constant even if said selected focus detecting area is changed.

17. A camera comprising:
    (a) detecting means for dividing a field of view into a plurality of small areas and detecting the luminance of each of said small areas;
    (b) focus detecting means capable of detecting focuses of a plurality of focus detecting areas of said field of view;
    (c) selecting means for manually selecting any one of said plurality of focus detecting areas; and
    (d) calculation means for calculating a light measurement value by giving a greater weight to the luminance, detected by said detecting means, of said small areas including said focus detecting area selected by said selecting means than those of the other small areas.

18. A camera according to claim 17, wherein said focus detecting means has a plurality of pairs of focus detecting devices and each of said pairs can detect a focusing state and an amount of defocus of one object in the respective focus detecting areas.

19. A camera according to claim 17, wherein said calculation means classifies said plurality of small areas into a plurality of medium areas in preset combinations, and the luminance of each of said plurality of classified medium areas is an average of the luminances of said plurality of small areas constituting each of said medium areas.

20. A camera comprising:
   (a) a detecting means for dividing a field of view into a plurality of small areas and detecting the luminance of each of said small areas;
   (b) focus detecting means capable of detecting focuses of a plurality of focus detecting areas in said field of view;
   (c) setting means for classifying said plurality of small areas into different preset combinations in accordance with a selection of one of said focus detecting areas; and
   (d) calculation means for calculating a light measurement value by using at least two of said small areas obtained by said detecting means and changing degrees of weight on said small areas classified by said setting means, said degrees of weight being differentiated between a first classified area including said one of said focus detecting areas selected by said setting means and a second classified area not including said one of said focus detecting areas.

21. A camera according to claim 20, wherein said focus detecting means can detect the focuses of said plurality of focus detecting areas separately.

22. A camera according to claim 20, wherein the selection of said one focus detecting area is performed in a manual mode in which an operator selects one of said plurality of focus detecting areas or in an automatic mode in which one of said plurality of focus detecting areas is selected according to preset program.

23. A camera according to claim 21, wherein said calculation means effects a calculation by giving a smaller weight in luminance to said second classified area than said first classified area.

24. A camera comprising:
   (a) a detecting means for dividing a field of view into a plurality of small areas and detecting the luminance of each of said small areas;
   (b) focus detecting means capable of detecting focuses of a plurality of focus detecting areas in said field of view;
   (c) setting means for classifying said plurality of small areas in accordance with a selection of one of said focus detecting areas, said setting means classifying said plurality of small areas into at least a first area including said selected focus detecting area, and a second area including a non-selected focus detecting area;
   (d) luminance difference detecting means for finding information on the luminance difference between said first area and said second area; and
   (e) calculation means for calculating a light measurement value by using the luminance of each of said small areas obtained by said detecting means and said luminance difference information found by said luminance difference detecting means.

25. A camera according to claim 24, wherein said focus detecting can detect the focuses of said plurality of focus detecting areas separately.

26. A camera according to claim 24, wherein the selection of said one focus detecting area is performed in a manual mode in which an operator selects one of said plurality of focus detecting areas or in an automatic mode in which one of said plurality of focus detecting areas in selected according to a preset program.

27. A camera according to claim 26, wherein a focus detecting area having the nearest object distance is selected according to said program in said automatic mode.

28. A camera according to claim 24, wherein said first and second areas classified by said setting means are respectively constituted by different combinations of said small areas in accordance with the selection of one of said focus detecting areas.

29. A camera according to claim 28, wherein the area ratio of said first and second areas is substantially constant even if said selected focus detecting area is changed.

30. A camera according to claim 24, wherein said light measurement value calculated by said calculation means compensates the luminance of said small areas by information found by said luminance difference detecting means.

* * * * *

UNITED STATES PATENT AND TRADEMARK OFFICE
CERTIFICATE OF CORRECTION

PATENT NO. : 5,189,460
DATED : February 23, 1993
INVENTOR(S) : Shingo Hayakawa

It is certified that error appears in the above-indentified patent and that said Letters Patent is hereby corrected as shown below:

ON THE COVER PAGE

At [75], "Kanagawa, Japan" should read --Yokohama, Japan--.

IN THE ABSTRACT

Line 5, "a" should be deleted.
Line 8, "preset" should read --preset combinations--.

On drawing

SHEET 4

Fig. 5, "DISPLAYY" should read --DISPLAY--.

COLUMN 1

Line 36, "the," should read --the--.

COLUMN 4

Line 14, "area," should read --areas,--.

COLUMN 7

Line 1, "19," should read --19--.

COLUMN 8

Line 1, "a light measurement mode" should be deleted.
Line 2, "selection information," should be deleted.

UNITED STATES PATENT AND TRADEMARK OFFICE
CERTIFICATE OF CORRECTION

PATENT NO. : 5,189,460
DATED : February 23, 1993
INVENTOR(S) : Shingo Hayakawa

It is certified that error appears in the above-indentified patent and that said Letters Patent is hereby corrected as shown below:

COLUMN 9

Line 41, "leans" should read --lens--.
Line 57, "$V_{01}=D_{01}+\delta_{01}$" should be deleted.
Line 58, "$V_{02}=D_{02}+\delta_{02}$" should be deleted.

COLUMN 10

Line 32, "an" should read --and--.

COLUMN 11

Line 22, "are" should read --area--.

COLUMN 14

Line 9, "clue" should read --value--.

COLUMN 17

Line 64, "$P_{H1}\Delta CB$" should read --$P_{H1},\Delta CB$--.

COLUMN 18

Line 8, "suing" should read --summing--.
Line 42, "suing" should read --summing--.

UNITED STATES PATENT AND TRADEMARK OFFICE
CERTIFICATE OF CORRECTION

PATENT NO. : 5,189,460
DATED : February 23, 1993
INVENTOR(S) : Shingo Hayakawa

It is certified that error appears in the above-indentified patent and that said Letters Patent is hereby corrected as shown below:

COLUMN 19

Line 5, "(b0i)" should read --(b-i)--.
    Line 26, "he" should read --the--.
    Line 29, "suing" should read --summing--.
    Line 31, "tot he" should read --to the--.
    Line 32, "vale" should read --value--.

COLUMN 22

Line 15, "lightly" should read --slightly--.

COLUMN 26

Line 20, "detecting" should read --detecting means--.

Signed and Sealed this

Eighth Day of February, 1994

Attest:

BRUCE LEHMAN

Attesting Officer        Commissioner of Patents and Trademarks